United States Patent [19]

Rocazella et al.

[11] Patent Number: 5,350,004
[45] Date of Patent: Sep. 27, 1994

[54] RIGIDIZED FILLER MATERIALS FOR METAL MATRIX COMPOSITES AND PRECURSORS TO SUPPORTIVE STRUCTURAL REFRACTORY MOLDS

[75] Inventors: Michael A. Rocazella; Kurt J. Becker; Michael K. Aghajanian, all of Newark, Del.

[73] Assignee: Lanxide Technology Company, LP, Newark, Del.

[21] Appl. No.: 971,850

[22] PCT Filed: May 9, 1991

[86] PCT No.: PCT/US91/03233
§ 371 Date: Jan. 8, 1993
§ 102(e) Date: Jan. 8, 1993

[51] Int. Cl.⁵ .............................................. B22D 19/14
[52] U.S. Cl. ...................................... 164/97; 164/80; 164/102; 264/44; 428/614
[58] Field of Search .................. 164/80, 91, 97, 98, 164/100, 101, 102; 264/44; 428/614

[56] References Cited

U.S. PATENT DOCUMENTS

| | | | |
|---|---|---|---|
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 29/123 B |
| 3,868,267 | 2/1975 | Gazza et al. | 117/22 |
| 3,915,699 | 10/1975 | Umehara et al. | 75/208 R |
| 3,969,553 | 7/1976 | Kondo et al. | 427/299 |
| 3,970,136 | 7/1976 | Cannell et al. | 164/108 |

(List continued on next page.)

FOREIGN PATENT DOCUMENTS 0071449 2/1983 European Pat. Off. .

(List continued on next page.)

OTHER PUBLICATIONS

F. Delannay, L. Froyen, and A. Deruyttere, "Review: The Wetting of Solids by Molten Metals and Its Relation to the Preparation of Metal-Matrix Composites", Journal of Materials Science, vol. 22, No. 1, pp. 1–16, Jan. 1987.

(List continued on next page.)

Primary Examiner—P. Austin Bradley
Assistant Examiner—Rex E. Pelto
Attorney, Agent, or Firm—Mark C. Mortenson; Stanislav Antolin

[57] ABSTRACT

The present invention relates to a novel process for forming metal matrix composite bodies. Specifically, in a particularly preferred embodiment for making metal matrix composite bodies by a spontaneous infiltration technique, an infiltration enhancer or an infiltration enhancer precursor or an infiltrating atmosphere are in communication with a rigidized filler material or a rigidized preform, at least at some point during the process, which permits molten matrix metal to spontaneously infiltrate the rigidized filler material or riigidized preform. A structural refractory material which holds the preform is made by forming a first precursor to the supportive structural refractory material and subsequently causing the precursor to become a rigid supportive structural member. Such spontaneous infiltration occurs without the requirement for the application of any pressure or vacuum.

20 Claims, 5 Drawing Sheets

U.S. PATENT DOCUMENTS

| | | | |
|---|---|---|---|
| 4,076,888 | 2/1978 | Perugin et al. | 427/227 |
| 4,082,864 | 4/1978 | Kendall et al. | 427/248 |
| 4,148,894 | 4/1979 | Hillig et al. | 428/408 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,455,135 | 9/1984 | Pinkhasov | 427/417.6 |
| 4,473,103 | 9/1984 | Kenney et al. | 164/97 |
| 4,548,253 | 10/1985 | Funatani et al. | 164/80 |
| 4,548,774 | 10/1985 | Akiyama | 264/44 |
| 4,559,246 | 12/1985 | Jones | 427/299 |
| 4,570,316 | 2/1986 | Sakamaki et al. | 29/156.8 R |
| 4,630,665 | 12/1986 | Novak et al. | 164/97 |
| 4,657,065 | 4/1987 | Wada et al. | 164/461 |
| 4,659,593 | 4/1987 | Rocher et al. | 427/190 |
| 4,662,429 | 5/1987 | Wada et al. | 164/461 |
| 4,673,435 | 6/1987 | Yamaguchi et al. | 75/235 |
| 4,713,111 | 12/1987 | Cameron et al. | 75/68 R |
| 4,753,690 | 6/1988 | Wada et al. | 148/11.5 A |
| 4,777,097 | 10/1988 | Kubo et al. | 428/614 |
| 4,802,524 | 2/1989 | Donomoto | 164/97 |
| 4,828,008 | 5/1989 | White | 164/66.1 |
| 4,871,008 | 10/1989 | Dwivedi et al. | 164/6 |
| 4,885,263 | 12/1989 | Brockmeyer | 264/44 |
| 4,932,099 | 6/1990 | Corwin | 164/97 |
| 4,995,444 | 2/1991 | Jolly | 164/100 |
| 5,000,248 | 3/1991 | Newkirk | 164/97 |
| 5,141,683 | 8/1992 | Hyndman | 264/44 |

FOREIGN PATENT DOCUMENTS

| | | | |
|---|---|---|---|
| 0080551 | 6/1983 | European Pat. Off. | |
| 0094353 | 11/1983 | European Pat. Off. | |
| 0101948 | 3/1984 | European Pat. Off. | |
| 0115742 | 8/1984 | European Pat. Off. | |
| 0313271 | 4/1989 | European Pat. Off. | |
| 0323945 | 7/1989 | European Pat. Off. | |
| 0333629 | 9/1989 | European Pat. Off. | |
| 0340957 | 11/1989 | European Pat. Off. | |
| 0364963 | 4/1990 | European Pat. Off. | |
| 0144441 | 8/1983 | Japan . | |
| 2156718 | 10/1985 | United Kingdom | 164/100 |

OTHER PUBLICATIONS

G. R. Edwards and D. L. Olson, "The Infiltration Kinetics of Aluminum in Silicon Carbide Compacts", Annual Report from Center for Welding Research, Colorado School of Mines, under ONR Contract No. M00014-85-K-0451, DTIC Report AD-A184 682, Jul. 1987.

A. Mortensen, M. N. Gungor, J. A. Cornie, and M. C. Flemings "Alloy Microstructures in Cast Metals Matrix Composites", Journal of Metals, vol. 38, No. 3, pp. 30-35, Mar. 1986.

International Search Report for International Patent Application Ser. No. PCT/US91/03233.

A. Mortensen, J. A. Cornie, and M. C. Flemings, "Solidification Processing of Metal-Matrix Composites", Journal of Metals, vol. 40, No. 2, pp. 12-19, Feb. 1988.

B. D. Sparks and F. W. Meadus, "The Development of an Infiltrated Lead/Iron Composite Material For Use as a Non-toxic Bird Shot", Composites, pp. 37-39, Jan. 1978.

RIGIDIZED FILLER MATERIALS FOR METAL MATRIX COMPOSITES AND PRECURSORS TO SUPPORTIVE STRUCTURAL REFRACTORY MOLDS

DESCRIPTION

1. Technical Field

The present invention relates to a novel process for forming metal matrix composite bodies. Particularly, in a preferred embodiment of the present invention directed to forming metal matrix composites by a spontaneous infiltration technique an infiltration enhancer and/or an infiltration enhancer precursor and/or an infiltrating atmosphere are in communication with a rigidized filler material or a rigidized preform, at least at some point during the process, which permits molten matrix metal to spontaneously infiltrate the rigidized filler material or rigidized preform. Such spontaneous infiltration occurs without the requirement for the application of any pressure or vacuum.

2. Background Art

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.) and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et el.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium. titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform cab be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ tort resulted in poor wetting of the ceramic by the molten metal to the extent that the metal did not flow freely into the ceramic void spaces. However, wetting was said to have improved when the vacuum was reduced to less than $10^{-6}$ tort.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which .is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing, in a preferred embodiment, a spontaneous infiltration mechanism for infiltrating a rigidized mass of filler material (e.g., a ceramic material) or a rigidized preform of filler material with molten matrix metal (e.g., aluminum) in the presence of an infiltrating atmosphere (e.g., nitrogen) under normal atmospheric pressures so long as an infiltration enhancer precursor and/or infiltration enhancer is present at least at some point during the process.

DESCRIPTION OF COMMONLY OWNED U.S. PATENT APPLICATIONS

The present invention is a Continuation-in-Part of U.S. patent application Ser. No. 07/521,200, filed May 9, 1990, in the names of Rocazella et al. and entitled "A Method for Forming Metal Matrix Composite Bodies by Rigidizing a Filler Material and Articles Produced Therefrom".

The subject matter of this application is further related to that of several other copending and co-owned patent applications and issued Patents. Particularly, these other copending patent applications and issued Patents describe novel methods for making metal matrix composite materials (hereinafter sometimes referred to as "Commonly Owned Metal Matrix Patents and Patent Applications").

A novel method of making a metal matrix composite material is disclosed in Commonly Owned U.S. patent application Ser. No. 049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0291441. According to the method of this White et invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, which issued on Jun. 19, 1990, from U.S. patent application Ser. No. 07/141,642, filed Jan. 7, 1988, in the names of Michael K. Aghajanian et al., and entitled "Method of Making Metal Matrix Composite with the Use of a Barrier" (now allowed in the United States), and which published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name GRAFOIL ®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/517,541, filed Apr. 24, 1990, which is a Continuation of U.S. patent application Ser. No. 07/168,284, filed Mar. 15, 1988, in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in these U.S. patent applications, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 7/521,043, filed May 9, 1990, which is a Continuation-in-Part application of U.S. patent application Ser. No. 07/484,753, filed Feb. 23, 1990, which is a Continuation-in-Part application of U.S. patent application Ser. No. 07/432,661, filed Nov. 7, 1989, which is a Continuation-in-Part application of U.S. patent application Ser. No. 07/416,327, filed Oct. 6, 1989 (now abandoned), which is a continuation-in-part application of U.S. patent application Ser. No. 7/349,590, filed May 9, 1989 (now abandoned), which in turn is a continuation-in-part application of U.S. patent application Ser. No. 7/269,311, filed Nov. 10, 1988 (now abandoned), all of which were filed in the names of Michael K. Aghajanian et al. and all of which are entitled "A Method of Forming Metal Matrix Composite Bodies By A Spontaneous Infiltration Process, and Products Produced Therefrom" (an EPO application corresponding to U.S. patent application Ser. No. 7/416,327 was published in the EPO on Jun. 27, 1990, as European Publication No. 0375588). According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material of preform. Aghajanian et el. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian et al. applications that the spontaneous infiltration behavior should occur in other matrix metal/infiltration enhancer precursor/infiltrating atmosphere systems.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by infiltrating a rigidized permeable mass of filler material or a rigidized preform with a molten matrix metal. Specifically, in a particularly preferred embodiment for forming metal matrix composites by a spontaneous infiltration technique, an infiltration enhancer and/or an infiltration enhancer precursor and/or an infiltrating atmosphere are in communication with the rigidized filler material or preform, at least at some point during the process, which permits molten matrix metal to spontaneously infiltrate the rigidized filler material or preform.

It has been discovered that, in some cases, spontaneous infiltration of a molten matrix metal into a filler material or preform may result in minor microstructural modifications of the filler material or preform. Specifically, the formation of infiltration enhancer from an infiltration enhancer precursor may result in an overall volumetric expansion which could cause a minor displacement of filler material when the filler material is tightly packed. For example, if infiltration enhancer was formed as a coating on a filler material or preform and the filler material or preform was relatively dense, the formation of a coating could result in a minor displacement of filler material resulting in the formation of minor cracks in the filler material or preform and/or a lower volume percent of filler in the resultant metal matrix composite body. The formed minor cracks could lead to metal rich channels in the metal matrix composite body which, for some applications, may not be desirable. The actual infiltration of a matrix metal into a preform or filler material may result in a similar minor movement of a filler material or preform with the same attendant disadvantages. The present invention provides a means for assuring that displacement of a loose filler or a preform of filler material is minimized as well as maximizing the volume percent of filler material, thus enhancing the resultant properties of a formed metal matrix composite body.

Moreover, although the present invention discusses primarily the formation of metal matrix composite bodies by a spontaneous infiltration process, it should be understood by those having ordinary skill in the art that the present invention is applicable to any metal matrix composite formation technique (e.g., pressure infiltration, vacuum infiltration, etc.) wherein the use of a rigidized filler or rigidized preform may enhance the resultant properties of a formed metal matrix composite body.

In a first preferred embodiment, a rigidized filler material or preform is achieved by mixing a filler material with a colloidal oxide binder (e.g., colloidal alumina, colloidal silica, etc.). The colloidal oxide binder causes the formation of a three-dimensionally interconnected matrix within the filler material which functions as a rigidizing skeleton for the filler material when, for example, the colloidal oxide and the filler material or preform are heated to a sufficient temperature for a sufficient time to result in an at least partially three-dimensional permeable mass. The skeleton that is formed may comprise a mixture of both colloidal oxide and filler material. The amount of colloidal oxide required to obtain desirable rigidizing properties can vary from about 1 weight percent to about 15 weight percent. The colloidal oxide may also affect the resultant properties of a formed metal matrix composite body. Specifically, typically, the colloidal oxide will be embedded by the matrix metal, thereby serving as a filler material.

In a second preferred embodiment of the invention, a filler material or preform can be rigidized by firing (e.g., at least partially sintering the filler material or preform)

so as to provide a three-dimensionally interconnected network of filler material. A sintering aid may or may not be required. The extent of firing (e.g., time and temperature) depends upon the amount of porosity desired in the filler material or preform prior to infiltration occurring. By increasing the density of the filler material or preform, the resultant volume percent of filler material present in the formed metal matrix composite increases. For example, by firing a silicon carbide filler material or preform in an oxygen-containing atmosphere, at least some of the silicon carbide may react with the oxygen to form silica, thereby increasing the volume of filler material to be infiltrated by the matrix metal. However, firing should not result in the complete closure of all interconnected porosity because spontaneous infiltration of molten matrix metal into the filler material would be adversely affected (e.g., if the interconnected porosity was eliminated, the matrix metal would have no means to infiltrate and embed the filler material).

In a third preferred embodiment, a supportive structural refractory material (e.g., including, but not limited to, materials such as steel, graphite, glass frit, colloidal oxide, etc.) surrounds at least a substantial portion of a filler material or preform and provides external structural support. Specifically, a filler material or preform may be placed within a rigid structure so as to prevent the filler material or preform from deforming during any portion of the spontaneous infiltration process. Alternatively, a precursor to a supportive structural refractory material could be provided to an exterior surface (e.g., coated upon an exterior surface) of a preform or filler material and become structurally supportive prior to molten matrix metal contacting said filler material or preform. The physical container and/or the refractory material surrounding a preform or filler material can be of any desirable composition and/or thickness with the primary selection criteria being that the material does not adversely affect spontaneous infiltration and that the material functions as a rigidizing means.

In a fourth preferred embodiment of the invention, each of the three aforementioned embodiments may be combined, in any manner, so as to enhance synergistically the rigidizing effects of each. For example, a colloidal oxide may be mixed with a filler material in combination with the placement of an exterior rigidizing means. Such combination may enhance further the rigidizing effects on a filler material or preform.

In a final preferred embodiment of the invention, when an infiltration enhancer precursor is caused to volatilize and react with, for example, an infiltrating atmosphere to form infiltration enhancer in at least a portion of a filler material or preform, the amount of infiltration enhancer that is formed can be minimized so as to reduce any deleterious effects that such formation may have. Particularly, for example, in the aluminum/magnesium/nitrogen system, when magnesium volatilizes and reacts with nitrogen, a magnesium nitride infiltration enhancer is formed in at least a portion of the preform or filler material. The formation of magnesium nitride, in excessive amounts, could result in a volumetric expansion of the preform or filler material. Such volumetric expansion could lead to microcracks within a preform or filler material. Accordingly, by controlling time and/or temperature and/or the amount of infiltration enhancer precursor and/or amount of infiltrating atmosphere, etc., the amount of infiltration enhancer which is formed in a preform or filler material can be controlled so that just a sufficient amount is manufactured to achieve desirable spontaneous infiltration.

In each of the above-discussed preferred embodiments, a precursor to an infiltration enhancer may be supplied to at least one of a filler material or preform, and/or a matrix metal and/or an infiltrating atmosphere. The supplied infiltration enhancer precursor may thereafter react with at least one of the filler material or preform and/or the matrix metal and/or the infiltrating atmosphere to produce infiltration enhancer in at least a portion of, or on, the filler material or preform. Ultimately, at least during the spontaneous infiltration, a desirable amount of infiltration enhancer should be in contact with at least a portion of the filler material or preform.

In another preferred embodiment of the invention, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be in contact with at least a portion of the filler material or preform.

This application discusses various examples of matrix metals, which at some point during the formation of a metal matrix composite contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discuss above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein (with particular emphasis being placed upon the aluminum/magnesium/nitrogen system), it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal and/or preform or filler material communicate with an infiltrating atmosphere for at least a portion of the process. In another preferred embodiment, the matrix metal and/or preform or filler material communicate with an infiltrating atmosphere for substantially all of the process. The preform or filler material will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

Moreover, by varying the composition of the matrix metal and/or the processing conditions, the physical and mechanical properties of the formed metal matrix composite bodies may be engineered to any particular application or need. Further, by subjecting a formed metal matrix composite body to a post treatment process (e.g., directional solidification, heat treatment, etc.) the mechanical and/or physical properties may be further engineered to meet any particular application or need. Still further, by controlling the processing conditions during the formation of a metal matrix composite the nitrogen content of the formed metal matrix composite may be tailored to meet a wide range of industrial applications.

Moreover, by controlling the composition and/or size (e.g., particle diameter) and/or geometry of the filler material or the material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. Moreover, by following the teachings of the present invention, even higher filler loadings can be achieved by minimizing the ability of the preform or filler material to be displaced or moved during any portion of the spontaneous infiltration process. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense and rigid filler material or preform (e.g., about 95 volume percent) with at least some interconnected porosity. Accordingly, by practicing any of the above teachings, alone or in combination, a metal matrix composite can be engineered to contain a desired combination of properties.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes with, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered nonfunctional as a barrier).

Further, suitable "barrier means" include materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "CarCass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially nonreactive with and/or of limited solubility in the matrix metal and may be single or multi-phase. Fillers may be provided in a wide variety of forms and sizes, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Hot-Topping", as used herein, refers to the placement of a substance on one end (the "topping" end) of an at least partially formed metal matrix composite which reacts exothermically with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal.

"Infiltration Enhancer", as used herein, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed from a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite body (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The nonreactive vessel may be disposable and removable after the spontaneous infiltration of the molten matrix metal has been completed.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Rigidized", as used herein, means that a preform or filler material has been made stronger so as to be more resistive to relative displacement by any exerted stresses.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF DRAWINGS

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1:
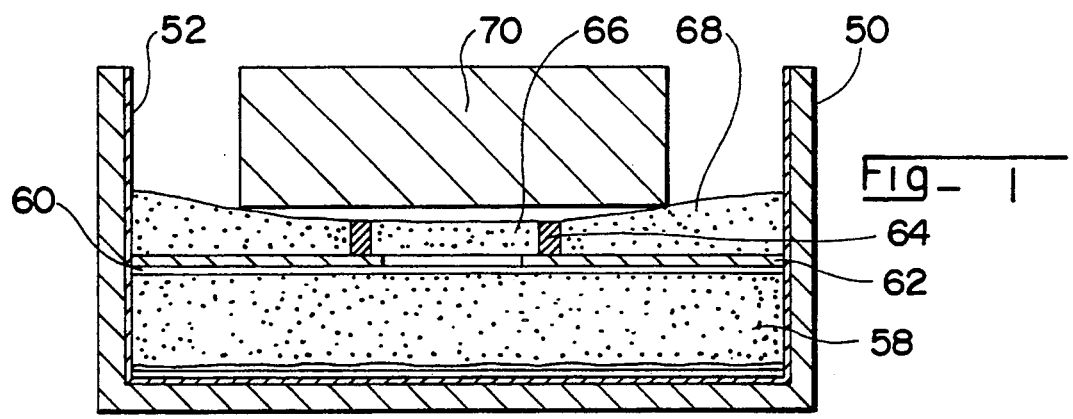
FIG. 1 is a schematic cross-sectional view of a lay-up used in accordance with Example 1 of the present invention.

The present invention relates to forming a metal matrix composite by infiltrating a rigidized filler material or preform with molten matrix metal. Specifically, in a particularly preferred method for forming metal matrix composite bodies by a spontaneous infiltration technique, an infiltration enhancer and/or an infiltration enhancer precursor and/or an infiltrating atmosphere are in communication with the rigidized filler material or preform, at least at some point during the process, which permits molten matrix metal to spontaneously infiltrate the rigidized filler material or preform.

In a first preferred embodiment, a rigidized filler material or preform is achieved by mixing a filler material with a colloidal oxide binder (e.g., colloidal alumina, colloidal silica, etc.). The colloidal oxide binder causes the formation of a three-dimensionally interconnected matrix within the filler material which functions as a rigidizing skeleton for the filler material when, for example, the colloidal oxide and the filler material or preform are heated to a sufficient temperature for a sufficient time to result in an at least partially three-dimensional permeable mass. The skeleton that is formed may comprise a mixture of both colloidal oxide and filler material. The amount of colloidal oxide required to obtain desirable rigidizing effects can vary from about 1 weight percent to about 15 weight percent. The colloidal oxide may also affect the resultant properties of a formed metal matrix composite body. Specifically, typically, the colloidal oxide will be embedded by the matrix metal, thereby serving as a filler material.

In a second preferred embodiment of the invention, a filler material or preform can be rigidized by firing (e.g., at least partially sintering the filler material) so as to provide a three-dimensionally interconnected network of filler material. A sintering aid may or may not be required. The extent of firing (e.g., time and temperature) depends upon the amount of porosity desired in the filler material or preform prior to infiltration occurring. By increasing the density of the filler material or preform, the resultant volume percent of filler material present in the formed metal matrix composite increases. For example, by firing a silicon carbide filler material in the presence of an oxygen-containing gas, at least some of the silicon carbide may react with the oxygen to form silica, thereby increasing the volume of filler to be infiltrated by the matrix metal. However, firing should not result in the complete closure of all interconnected porosity because infiltration of molten matrix metal into the filler material would be adversely affected (e.g., if the interconnected porosity was eliminated, the matrix metal would have no means to infiltrate and embed the filler material).

In a third preferred embodiment, a supportive structural refractory material (e.g., including, but not limited to, materials such as steel, graphite, glass frit, colloidal oxide, etc.) surrounds at least a substantial portion of a filler material or preform and provides external structural support. Specifically, a filler material or preform may be placed within a rigid structure so as to prevent the filler material or preform from deforming during any portion of the infiltration process. Alternatively, a precursor to a supportive structural refractory material could be provided to an exterior surface (e.g., coated upon an exterior surface) of a preform or filler material and become structurally support lye prior to molten matrix metal contacting said filler material or preform. The physical container and/or the refractory material surrounding a preform or filler material can be of any desirable composition and/or thickness with the primary selection criteria being that the material does not adversely affect infiltrating and that the material functions as a rigidizing means.

In a fourth preferred embodiment of the invention, each of the three aforementioned embodiments may be combined, in any manner, so as to enhance synergistically the rigidizing effects of each. For example, a colloidal oxide may be mixed with a filler material in combination with the placement of an exterior rigidizing means. Such combination may enhance further the rigidizing effects on a filler or preform.

In a final preferred embodiment of the invention specifically for use in the formation of metal matrix composite bodies by a spontaneous infiltration technique, when an infiltration enhancer precursor is caused to volatilize and react with, for example, an infiltrating atmosphere to form infiltration enhancer in at least a portion of a filler material or preform, the amount of infiltration enhancer that is formed can be minimized so as to reduce any deleterious effects that such formation may have. Particularly, for example, in the aluminum/magnesium/nitrogen system, when magnesium volatilizes and reacts with nitrogen, a magnesium nitride infiltration enhancer is formed in at least a portion of the preform or filler material. The formation of magnesium nitride, in excessive amounts, could result in a volumetric expansion of the preform or filler material. Such volumetric expansion could lead to microcracks within a preform or filler material. Accordingly, by controlling time and/or temperature and/or the amount of infiltration enhancer precursor and/or amount of infiltrating atmosphere, etc., the amount of infiltration enhancer which is formed in a preform or filler material can be controlled so that just a sufficient amount is manufactured to achieve desirable spontaneous infiltration.

In regard to each of the above-discussed preferred embodiments, specifically in combination with the formation of metal matrix composites by a spontaneous infiltration technique, and without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located of transportable to a location which permits the infiltration enhancer precursor to interact with at least one of the infiltrating atmosphere, and/or the preform of filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer precursor could volatilize from the molten matrix metal and react with at least one of the filler material or preform and/or the infiltrating atmosphere. Such reaction could result in the formation of an infiltration enhancer which may be a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react with the solid species (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In another preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium is present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in the required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, it has been observed that there was substantially no infiltration of nominally pure aluminum alloyed only with 10 percent silicon at 1000° C. into a bedding of 500 mesh, 39 CRYSTOLON ® (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/magnesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler material or preform, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix metal alloy, the process conditions, the reactivity of the molten matrix metal alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in U.S. Pat. No. 4,851,375, entitled "Methods of Making Composite Ceramic Articles Having Embedded Filler"

in the names of Marc S. Newkirk et al., also exhibit desirable infiltration properties relative to commercially available alumina products. The subject matter of each of the issued Patents is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, at one or in combination, a metal matrix composite can be engineered to contain a desired combination of properties.

The method of forming metal matrix composites according to the present invention, not being dependent on the use of pressure to force or squeeze molten matrix metal into a rigidized preform or a rigidized mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified prior to rigidizing provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming metal matrix composite bodies in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product.

For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18-20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material or preform and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

Suitable barrier means include materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark GRAFOIL®, registered to Union Carbide. This graphite foil exhibits sealing characteristics that prevent the migration of molten aluminum alloy beyond the defined surface boundary of the filler material. This graphite foil is also resistant-to heat and is chemically inert. GRAFOIL® graphite foil is flexible, compatible, conformable and resilient. It can be made into a variety of shapes to fit any barrier application. However, graphite barrier means may be employed as a slurry or paste or even as a paint film around and on the boundary of the filler material or preform. GRAFOIL® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1-30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic Compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

This Example demonstrates that through the use of a colloidal alumina refractory high temperature binder in a preform that any preform expansion which might otherwise occur during spontaneous infiltration without the use of the colloidal alumina in the preform can be reduced or even substantially completely eliminated.

An aqueous solution of BLUONIC® A colloidal alumina (Buntrock Industries, Inc., Lively, Va.) totaling about 261 grams was diluted with about 523 grams of water and placed into a 2 liter NALGENE® plastic jar (Nalge Company, Rochester, N.Y.). About 1281 grams of 220 grit 39 CRYSTOLON® green silicon carbide particulate (Norton Company, Worcester, Mass.) and about 549 grams of 500 grit 39 CRYSTOLON® green silicon carbide particulate were added to the jar to prepare a slurry for sediment casting. The total slurry weight was about 2615 grams and the slurry comprised by weight about 4g percent 220 grit silicon carbide, about 21 percent 500 grit silicon carbide, about 2 percent colloidal alumina (dry basis) and about 28 percent water. After roll mixing the slurry in the plastic jar for about 45 minutes, the slurry was poured into a Grade GI-1000 silicone rubber mold (Plastic Tooling Supply Co., Exton, Pa.) having an internal cavity measuring about 3 inches (76 mm) square and about 1½ inches (38 mm) deep. The mold was vibrated to assist in sedimentation. After vibrating for about ½ hour, the excess water on the surface of the formed sediment cast preform was removed with a paper towel. After vibrating for an additional 1 to 1½ hours, the remaining surface water was removed and the silicone rubber mold was removed from the vibration table and placed into a freezer. Residual water in the preform was permitted to freeze thoroughly, then the silicone rubber mold and its preform were removed from the freezer and the frozen sediment cast preform was withdrawn from the mold. The preform was then placed on a bed of 90 grit 38 ALUNDUM® alumina particulate material (Norton Company) and allowed to dry in air at room temperature for about 16 hours.

After drying, the sediment cast preform was transferred to a different bedding of 90 grit 38 ALUNDUM® alumina supported by a refractory plate measuring about 12 inches (305 mm) long by about 6 inches (152 mm) wide by about 1 inch (25 mm) thick and placed into a resistance heated air atmosphere furnace. The furnace temperature was increased from about room temperature to a temperature of about 1050° C. in a period of about 10 hours. After maintaining a temperature of about 1050° C. for about 2 hours, the temperature was decreased to about room temperature in a period of about 10 hours.

As shown in FIG. 1, a graphite foil box 52 measuring about 4 inches (102 mm) square and about 3 inches (76 mm) tall was fabricated from a single sheet of GRAFOIL® graphite foil (Union Carbide Company, Danbury, Conn.) measuring about 0.015 inches (0.38 mm) thick by making strategically located cuts and folds in the sheet. The folds in the GRAFOIL® sheet were cemented together with RIGIDLOCK® graphite cement (Polycarbon Corporation, Valencia, Calif.). Strategically placed staples helped to reinforce the graphite cement. The GRAFOIL® box 52 was then placed within a graphite boat 50, said graphite boat 50 having interior dimensions substantially the same as the box 52. The fired preform 58 was then placed into the bottom of the GRAFOIL® box 52. About 0.36 gram of magnesium particulate 60 (−100 mesh, Hart Corporation, Tamaqua, Pa.) was sprinkled evenly over the top surface of the fired preform 58. A gating means 62, 64 comprising a sheet of GRAFOIL® 62 measuring about 4 inches (102 mm) square with an approximately 1½ inch (38 mm) diameter hole cut in the center, was cemented with RIGIDLOCK® graphite cement to a graphite riser ring 64 measuring about ⅜ inch (10 mm) tall and about 1½ inches (38 mm) in inside diameter such that the inside diameter of the ring substantially coincided with the hole in the GRAFOIL® sheet 62. The gating means 62, 64 was then placed into the GRAFOIL® box 52 on top of the layer of magnesium particulate 60 and oriented such that the GRAFOIL® sheet 62 contacted the magnesium particulate layer 60 and the graphite riser ring 64 was on a top surface of the GRAFOIL® sheet 62. The cavity inside the graphite riser ring 64 was filled with an admixture 66 comprising by weight about 50 percent magnesium particulate (−100 mesh, Hart Corporation), about 1 percent magnesium particulate (−325 mesh, Hart Corporation), about 25 percent 54 grit 39 CRYSTOLON® green silicon carbide particulate (Norton Company) and about 24 percent 90 grit 39 CRYSTOLON® green silicon carbide particulate. A bedding material admixture 68 Comprising by weight about 15 percent Grade P-941 glass frit (Industrial Chemicals Division of Mobay Chemical Corporation, Baltimore, Md.) and the balance equal weight fractions of 90 grit, 220 grit, and 500 grit E1ALUNDUM® alumina (Norton Company) was poured into the GRAFOIL® box 52 on the GRAFOIL® sheet 62 around the graphite riser ring 64 to a level substantially flush with the top of the ring 64 but slightly higher out towards the walls of the GRAFOIL® box 52. A matrix metal ingot 70 weighing about 300 grams and measuring about 2 inches (51 mm) square and about 1¾ inches (44 mm) tall and comprising by weight about 15 percent silicon, about 5 percent magnesium and the balance aluminum, was placed into the GRAFOIL ® box 52 and centered over the graphite riser ring 64 to form a lay-up.

The graphite boat 50 and its contents were placed into a resistance headed controlled atmosphere furnace at substantially room temperature. The furnace was sealed, evacuated to about 30 inches (762 mm) of mercury vacuum, and backfilled with nitrogen gas to about atmospheric pressure. A nitrogen gas flow rate of about 4 liters per minute was established. The temperature in the furnace was then increased to about 825° C. at a rate of about 150° C. per hour. After maintaining a temperature of about 825° C. for about 10 hours, the temperature was then decreased to about 700° C. at a rate of about 200° C. per hour. At a temperature of about 700° C., the furnace was opened and the graphite boat 50 and its contents were removed and placed onto a water cooled aluminum quench plate. FEEDOL ® No. 9 hot topping particulate mixture was poured onto the residual molten matrix metal to directionally solidify the matrix metal in the metal matrix composite body. After the bulk of the exothermic hot topping reaction had subsided, the top and sides of the graphite boat 50 were covered with an approximately 2 inch (51 mm) thick layer of CERABLANKET ® ceramic fiber insulation material to assist in the directional solidification of the matrix metal. After cooling to substantially room temperature, the GRAFOIL ® box 52 was removed from the graphite boat 50 and was disassembled to reveal that the matrix metal had infiltrated the preform to produce a metal matrix composite body. The residual matrix metal was separated from the remainder of the lay-up by using moderate hand pressure. The bedding material admixture 68 was removed with light hammer blows. The graphite riser ring 64 and its attached GRAFOIL ® sheet 62 were removed by sandblasting. Measurement of the dimensions of the formed metal matrix composite using a pair of calipers revealed that substantially no dimensional change had taken place during the spontaneous infiltration process. Thus, this Example illustrates that the use of a refractory binder comprising colloidal alumina permits the formation of a metal matrix composite body which substantially identically replicates the shape of the preform.

EXAMPLE 2

This Example demonstrates that through the use of a colloidal alumina refractory high temperature binder in a preform that any preform expansion which may otherwise occur during spontaneous infiltration without the use of the colloidal alumina in the preform can be reduced or even substantially completely eliminated.

Two preforms, each preform having approximate measurements of 7 inches (178 mm) by 7 inches (178 mm) by 0.5 inch (13 mm), were sediment cast from a mixture of a 220 grit alumina material known by the trade name 38 ALUNDUM° and produced by Norton Co., and colloidal alumina (Nyacol AL-20). The approximate weight ratio of the colloidal alumina to the 220 grit 38 ALUNDUM ® was 70/30.

Figure 2:
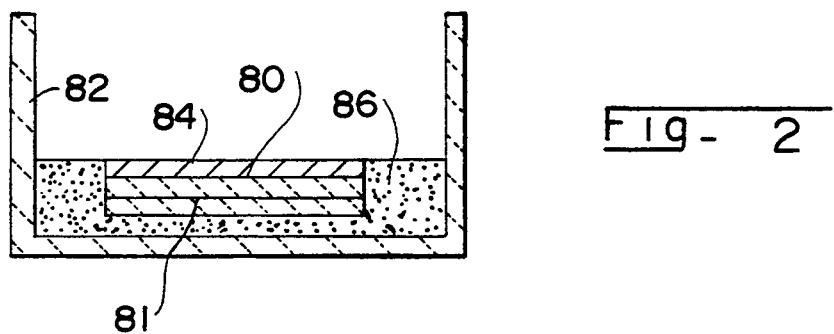
FIG. 2 is a schematic cross-sectional view of a lay-up used in accordance with Example 2 of the present invention.

After the preforms had dried and set, a thin (approximately 1/64 inch (0.4 mm) thick) layer of colloidal alumina paste (Nyacol AL-20) was painted on a surface of each of the two preforms. The two painted surfaces were then brought into contact so as to sandwich the colloidal alumina between the two preforms. As shown in FIG. 2, this assembly of preforms 80, including the interfacial layer 81 of colloidal alumina, was then placed within a refractory boat 82 on top of an approximately ½ inch (13 mm) thick layer of Grade HCT titanium diboride 86 produced by Union Carbide. An ingot 84 of matrix metal having approximate dimensions of 7 inches (178 mm) by 7 inches (178 mm) by ½ inch (13 mm) and comprising by weight approximately 5% silicon, 5% zinc, 7% Mg, 2% copper and the balance aluminum was placed on top of the assembly of preforms 80. Additional Grade HCT titanium diboride was then added to the refractory boat 82 until the surface of the bed 86 of titanium diboride was approximately level with the upper surface of the matrix metal ingot 84.

The setup, consisting of the refractory boat 82 and its contents was then placed within a controlled atmosphere electric resistance heated vacuum furnace at room temperature. A high vacuum (approximately 1×10-4 torr) was then achieved within the furnace and the furnace temperature was raised to about 200° C. in about 45 minutes. The furnace temperature was maintained at about 200° C. under vacuum conditions for approximately 2 hours. After this initial two hour heating period, the furnace was backfilled with nitrogen gas to approximately 1 atmosphere and the temperature was raised to about 865° C. in approximately 5 hours; maintained at about 865° C. for about 18 hours; and then ramped to room temperature in about 5 hours.

After reaching room temperature, the setup was removed from the furnace and disassembled. It was observed that the formed metal matrix composite body corresponded in size and shape to the preform.

EXAMPLE 3

This Example demonstrates that through the use of a colloidal silica refractory high temperature binder in a mold surrounding a preform, that any preform expansion which may otherwise occur during spontaneous infiltration without the use of the colloidal silica in the mold can be reduced or even substantially completely eliminated.

Figure 3:
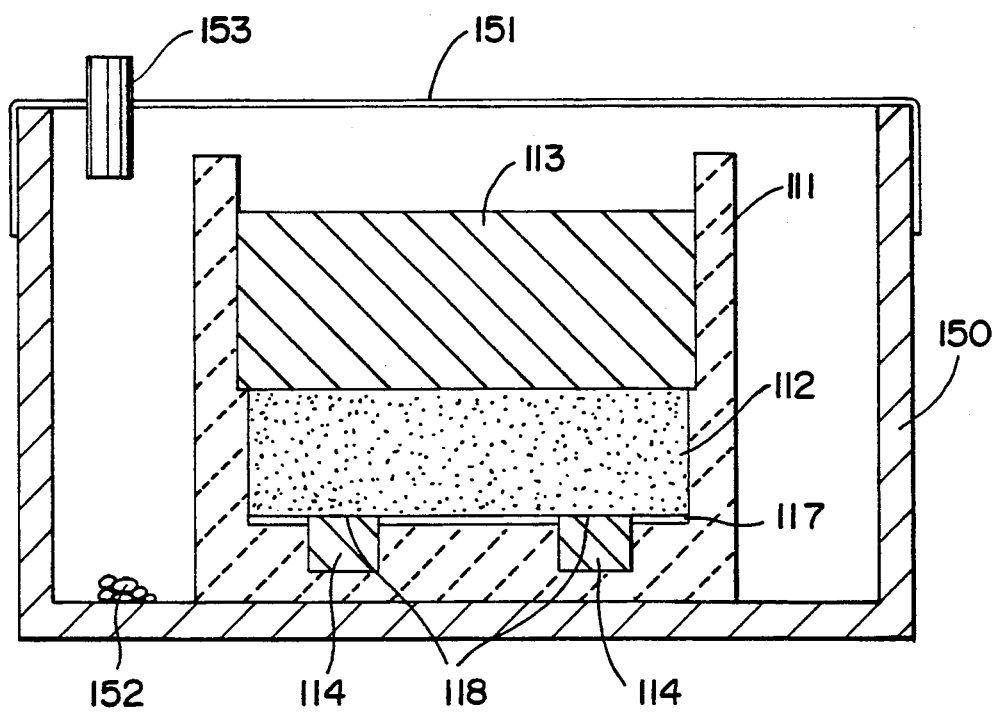
FIG. 3 is a schematic cross-sectional view of a lay-up used in accordance with Example 3 of the present invention.

As shown in FIG. 3, a silica mold 111 having an inner diameter of approximately 5 inches (127 mm) by 5 inches (127 mm) and 3¼ inches (83 mm) in height, and having nine holes of about ¾ inch (19 mm) diameter and ¾ inch (19 mm) depth in the bottom of the mold 111, was formed by first mixing a slurry of about 2.5 to 3 parts by weight of RANCO-SIL ™ 4 silica powder, about 1 part by weight colloidal silica (Nyacol 830 from Nyacol Products of Ashland, Mass.) and about 1 to 1.5 parts by weight of RANCO-SIL ™ A silica sand (Ransom and Randoll of Maumee, Ohio). The slurry was poured into a rubber mold having the negative shape of the desired silica mold and placed in a freezer overnight. The silica mold was subsequently removed from the rubber mold, fired at about 800° C. in an air furnace for about 1 hour and allowed to cool to room temperature.

The bottom surface of the formed silica mold 111 was covered with an approximately 5 inch (127 mm) by 5 inch (127 mm) by 0.010 inch (6.25 mm) thick PF-25-H graphite tape product 117, sold by TTAmerica, Portland, Oreg., under the trade name PERMA FOIL ®, having approximately ¾ inch (19 mm) diameter holes 118 cut into the graphite tape sheet 117 to correspond in position to the holes in the bottom of the silica mold 111. The holes in the bottom of the mold 111 were filled with approximately ¾ inch (19 mm) diameter by ¾ inch (19 mm) thick plugs 114 of a metal identical in composition to the matrix metal alloy which comprised approximately 10% by weight magnesium and the balance aluminum. Approximately 819 grams of a 500 grit alumina filler material known as 38 ALUNDUM® and produced by Norton Company, was mixed with about 5 weight percent magnesium powder and shaken for about 15 minutes in a NALGENE® jar. The filler material mixture was then placed into the mold 111 to a depth of approximately ¾ inch (19 mm) and tamped lightly to level the surface of the filler material mixture 112. A matrix metal ingot 113 weighing approximately 1399 grams and comprising about 10% by weight magnesium and the balance aluminum, was placed on top of the filler material mixture 112 within the silica mold 111. The mold 111 and its contents were then placed into an approximately 10 inch (254 mm) by 10 inch (254 mm) by 8 inch (203 mm) high stainless steel container 150. A titanium sponge material 152, weighing about 20 grams, from Chemalloy Company Inc., Bryn Mawr, Pa., was sprinkled into the stainless steel container 150 around the silica mold 111. A sheet of copper foil 151 was placed over the exposed surface of the stainless steel container 150 so as to form an isolated chamber. A nitrogen purge tube 153 was provided through the sheet of copper foil 151, and the stainless steel container 150 and its contents were placed into an air atmosphere resistance heated Unique utility box furnace. The system was ramped from room temperature to about 600° C. at a rate of about 400° C. per hour with a nitrogen flow rate of about 10 liters per minute, then heated from about 600° C. to about 775° C. at a rate of about 400° C. per hour with a nitrogen flow rate of about 2 liters per minute. The system was held at about 775° C. for about 1.5 hours with a nitrogen flow rate of about 2 liters per minute. The system was removed from the furnace at about 775° C., a substantial portion of the excess molten alloy was poured out, and a room temperature copper chill plate having dimensions of approximately 5 inches (127 mm) by 5 inches (127 mm) by 1 inch (13 mm) thick was placed within the silica mold 111 such that it contacted a top portion of any remaining matrix metal 113, to directionally cool the formed composite.

Upon removal from the silica mold, it was observed that the formed metal matrix composite body corresponded in size and shape to the preform.

EXAMPLE 4

A tape cast silicon carbide preform, obtained from Keramos Industries, Inc., Morrisville, Pa., having dimensions of about 8 inches (203 mm) by about 7 inches (177 mm) by about 0.145 inch (4.mm) thick and comprising by weight about 70% 220 grit, 10% 500 grit, 10% 800 grit, and 10% 1000 grit 3 g CRYSTOLON® green silicon carbide particulate (Norton Company, Worcester, Mass.) was placed, with its flatest side facing down, on a perforated cordierite plate. The preform was covered with a sheet of FIBERFRAX® 907-J fiber insulation paper (The Carborundum Company, Niagara Falls, N.Y.). A second cordierite plate was placed on top of the fiber insulation paper to form an assembly. The assembly was placed within a room temperature air atmosphere furnace. The temperature in the furnace was increased from about room temperature to about 425° C. at a rate of about 50° C. per hour. After reaching a temperature of about 425° C., the temperature in the furnace was increased to about 1050° C. at a rate of about 200° C. per hour. After maintaining a temperature of about 1050° C. for about 1 hour, the temperature in the furnace was decreased to about room temperature in about 5 hours. The preform was removed from the furnace, and it was observed that the preform had sintered and formed a three-dimensional rigidized body. The preform was placed on a balance, and a preform weight of about 257.04 grams was recorded.

The preform was placed on a rotatable platform with its flat side facing up. A first edge and the flat side of the preform were spray coated with KRYLON® acrylic spray coating (Borden, Inc., Columbus, Ohio). The rotatable platform and preform were rotated 90° and a second edge of the preform and the flat side were spray coated with KRYLON® acrylic spray coating. This procedure was repeated until all four edges of the preform were spray coated: with one coat of KRYLON® acrylic spray coating and the flat side of thereform was coated with four coats of KRYLON® acrylic spray coating. A temperature of about 65° C. was established within an air atmosphere furnace, and the preform was transferred from the rotatable platform to the air atmosphere furnace. After about 10 minutes, the preform was removed from the air atmosphere furnace and placed under a fume hood until the coating had substantially dried. The preform was removed from the fume hood, placed on a balance, and a preform weight of about 257.22 grams was recorded.

A mixture comprising by volume about 50% DAG® 154 colloidal graphite (Acheson Colloids, Port Huron, Mich.) and about 50% denatured ethanol was prepared. The preform was placed on a rotatable platform with its flat side facing up, and an air brush was used to apply a thin layer of the mixture to a first edge and the flat side of the preform. The platform and preform were rotated 90° and the mixture was applied to a second edge and the flat side of the preform. This procedure was repeated until all four edges of the preform were coated with two coats and the flat side of the preform was coated with eight coats of the mixture, although due to overspray and run-off of the mixture during the coating of the flat side of the preform, the thickness of the coatings on the edges approximately equalled the thickness of the coating on the flat side of the preform. The preform was then allowed to dry. After the preform was substantially dry, the preform was placed on a balance and a preform weight of about 257.92 grams was recorded. The preform was placed on a rotatable platform with the flat side facing down. The preform was spray coated with KRYLON® acrylic spray coating in a manner substantially the same as for the KRYLON® coating described above. A temperature of about 65° C. was established within an air atmosphere furnace, and the preform was transferred from the rotatable platform to the air atmosphere furnace and then heated for about 10 minutes. The preform was removed from the air atmosphere furnace and placed under a fume hood. After the preform had substantially dried, the preform was placed on a balance and a preform weight of about 258.27 grams was recorded. The preform was then placed, with its flat side facing down, on a rotatable platform and an air brush was used to apply a thin layer of the mixture to the top portion of the preform. The mixture was then allowed to dry completely. A total of three coatings were applied in this manner, then the preform was placed on a balance and a preform weight of about 259.23 grams was recorded.

Figure 4:
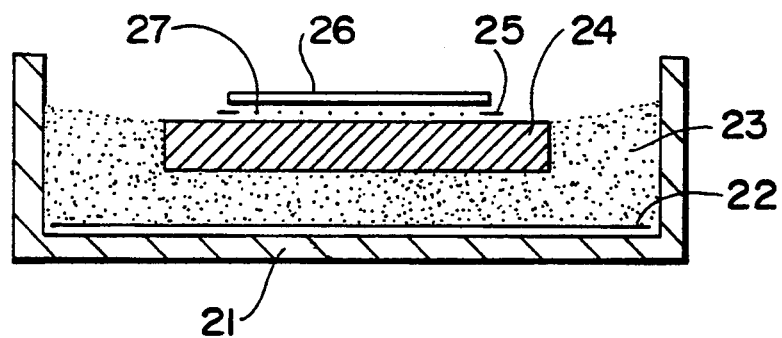
FIG. 4 is a schematic cross-sectional view of a lay-up used in accordance with Example 4 of the present invention.

As shown in FIG. 4, a sheet of GRAFOIL® graphite foil 22 (Union Carbide Company, Danbury, Conn.) measuring about 13¼ inches (337 mm) by about 9¼ inches (235 mm) by about 0.015 inch (0.4 mm) thick was placed into the bottom of a graphite boat 21 having inner dimensions of about 13¼ inches (337 mm) by about 9¼ inches (235 mm) by about 1 inch (25 mm) high. An about ⅜ inch (9 mm) thick layer of bedding material 23, comprising by weight about 10% F-69 borosilicate glass frit (Fusion Ceramics, Inc., Carrollton, Ohio) and the balance comprising about 70% by weight 36 grit and about 30% by weight 60 grit E-38 ALUNDUM° alumina (Norton Company, Worcester, Mass.) was poured into the graphite boat 21 on top of the GRAFOIL® sheet 22. A foam brush was used to establish a level layer of bedding material 23.

A matrix metal ingot 24 weighing about 1462.92 grams and comprising by weight about 20% silicon, 5% magnesium and the balance aluminum, was placed into an ethanol bath. The surface of the matrix metal ingot 24 was cleaned by hand utilizing a paper towel, then the matrix metal ingot 24 was removed from the ethanol bath and placed within an air atmosphere furnace. A temperature of about 68° C. was established within the furnace, and after heating the matrix metal ingot for about 15 minutes, the matrix metal ingot 24 was removed from the furnace and placed on top of the bedding material 23 within the graphite boat 21. Additional bedding material 23 was poured into the graphite boat 21 around the matrix metal ingot 24 to a level substantially the same as the top portion of the matrix metal ingot 24. A sheet of GRAFOIL® graphite foil (Union Carbide Company, Danbury, Conn.) measuring about 8¼ inches (210 mm) by about 7¼ inches (184 mm) by about 0.005 inches (0.1 mm) thick was prepared by first cutting a rectangular hole measuring about 7⅞ inches (200 mm) by about 6⅞ inches (175 mm) in the center of the GRAFOIL® sheet to produce a GRAFOIL® frame 25. One side of the GRAFOIL® frame 25 was spray coated with KRYLON® acrylic spray coating. The GRAFOIL® frame was then centered on top of the matrix metal ingot 24 with the acrylic coating in contact with the matrix metal ingot 24. The portion of the matrix metal ingot 24 within the inner boundaries of the GRAFOIL® frame 25 was spray coated with KRYLON® acrylic spray coating. About 5.6 grams of −50 mesh atomized magnesium 27 {Hart Corporation, Tamaqua, Pa.) was sprinkled onto the portion of the matrix metal ingot 24 within the inner boundaries of the GRAFOIL® frame 25. The GRAFOIL® frame 25, the −50 mesh atomized magnesium 27 and the matrix metal ingot 24 were then spray coated with KRYLON® acrylic spray coating, and the acrylic spray coating was allowed to dry for about 3 minutes. The preform 26 was centered on top of the GRAFOIL® frame 25, with the flat side of the preform 26 in contact with the GRAFOIL® frame 25, the −50 mesh atomized magnesium 27 and the matrix metal ingot 24.

The graphite boat 21 and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased from about room temperature to about 225° C. at a rate Of about 200° C. per hour. After maintaining a temperature of about 225° C. for about 52 hours, the temperature in the furnace was increased to about 850° C. at a rate of about 200° C. per hour. After maintaining a temperature of about 850° C. for about 10 hours, the temperature in the furnace was decreased to about 825° C. at a rate of about 200° C. per hour. The graphite boat 21 and its contents were then removed from the furnace. An about 15 inch (381 mm) by about 11 inch (27g mm) by about 2 inch (51 mm) thick layer of CERABLANKET® ceramic insulation material (Manville Refractory Products, Denver, Colo.) was placed onto a graphite table. A single sheet of GRAFOIL° graphite foil having dimensions of about 15 inches (381 mm) by about 11 inches (279 mm) by about 0.015 inch (0.38 ram) thick was placed on top of the CERABLANKET® fiber insulation material. The graphite boat 21 and its contents were placed on top of the GRAFOIL® graphite foil and allowed to cool. After about 13 minutes, light chisel blows were applied to the solidified carcass of matrix metal causing the formed metal matrix composite to separate from the matrix metal. Thus, this example demonstrates that a rigidized filler material may be spontaneously infiltrated by a molten matrix metal in accordance with the present invention.

EXAMPLE 5

This Example further demonstrates that a rigidized filler material may be spontaneously infiltrated by a molten matrix metal to yield a metal matrix composite body. Specifically, about 166.5 grams of a mixture comprising by weight about 30% AIRVOL® PVA (Air Products and Chemicals, Inc., Allentown, Pa.) and about 70% deionized water was placed into a plastic jar. About 24.9 grams of polyethylene glycol 400 (J. T. Baker, Inc., Jackson, Tenn.), about 2.4 grams of zinc stearate (Fischer Scientific, Pittsburgh, Pa.) and about 106.2 grams of LUDOX® SM colloidal silica (E. I. DuPont DeNemours and Co., Inc., Wilmington, Del.) were added to the jar. A hand-held drill with an impeller attachment was used to thoroughly mix the contents of the jar to prepare a binder solution.

About 1750 grams of 320 grit, about 250 grams of 800 grit, and about 250 grams of 1000 grit 39 CRYSTOLON® green silicon carbide particulate (Norton Company, Worcester, Mass.) were added to a one gallon plastic jar (Fischer Scientific, Pittsburgh, Pa.). About 250 grams of LC12N $Si_3N_4$ powder (Herman C. Stark, Berlin, Germany) were added to the jar and the plastic jar and its contents were mixed on a jar mill for about two hours. The plastic jar and its contents were then removed from the jar mill and the contents of the jar were poured into a Model RV02 Eirich mixer (Eirich Machines, Maple, Ontario, Canada). About 100 grams of the binder solution were poured into the Eirich mixer. The mixer was turned on with the pan and rotor settings set to fast. After about one minute, the mixer was turned off, a plastic straight edge was utilized to remove any silicon carbide particulate or silicon nitride powder from the sides of the mixer bowl, and an additional about 100 grams of binder solution was added to the mixer. The mixer was turned on a second time with the pan and rotor settings set to fast. After about one minute, the mixer was turned off, a plastic straight edge was used to scrape any silicon carbide particulate or silicon nitride powder from the sides of the bowl, and an additional about 100 grams of binder solution was added to the mixer. The mixer was turned on a third time with the pan and rotor settings set to fast. After about one minute, the mixer was turned off and the binder/silicon carbide particulate/silicon nitride powder mixture was poured onto a table that had been previously covered with brown paper. An about ⅛ inch (3 mm) to about ¼ inch (6 mm) thick layer of the mixture was established on the brown paper and the mixture was allowed to dry overnight.

The mixture was placed into a Model B Ro-tap testing sieve shaker (Tyler Combustion Engineering, Inc.) and sifted through a 25 mesh screen. About 160 grams of the mixture was placed into a die mold having dimensions of about 3 inches (76 mm) square and pressed at about 90 tons of pressure utilizing a CARVER ® air type hydraulic press (Fred S. Carver, Inc., Menomonee Falls, Wisc.). The resultant preform was removed from the hydraulic press and the preform dimensions, measuring about 3 inches (76 mm) square by about ½ inch (13 mm) thick, were recorded. A total of four preforms were prepared in this manner.

The preforms were-then placed onto a refractory support plate, which had been covered with a sheet of FIBERFRAX ® 907-J fiber insulation paper (The Carborundum Company, Niagara Falls, N.Y.). The supported preforms were placed into a room temperature resistance heated air atmosphere furnace. The furnace temperature was raised from about room temperature to about 500° C. at a rate of about 100° C. per hour. After maintaining a temperature of about 500° C. for about two hours, the temperature was then increased from about 500° C. to about 850° C. at a rate of about 200° C. per hour. After maintaining a temperature of about 850° C. for about four hours, the temperature was decreased to about room temperature in about five hours. The preforms were removed from the furnace, and it was observed that the preforms had sintered and formed a three-dimensional rigidized structures.

A foam brush was utilized to apply a uniform coating of DAG ® 154 colloidal graphite (Acheson Colloids Co., Port Huron, Mich.) to the four ½ inch (13 mm) thick sides and to one 3 inch (76 mm) square surface of each preform. The coating was allowed to dry and a second coating of DAG ® 154 colloidal graphite was applied to the five sides of each preform previously coated. Each preform was turned over and the final side was coated with DAG ® 154 colloidal graphite. However, before the DAG ® 154 colloidal graphite could substantially dry, excess DAG ® 154 was removed from the surface of the preform utilizing a paper towel. A second coating of DAG ® 154 colloidal graphite was applied to the final side of each preform and a paper towel was again used to remove excess coating before it dried.

Figure 5:
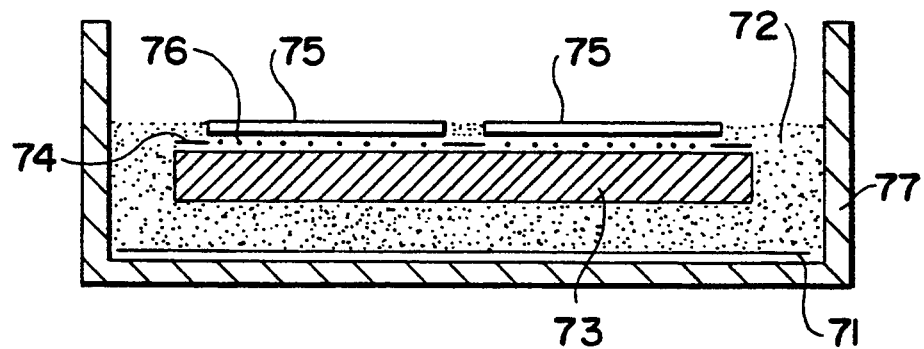
FIG. 5 is a schematic cross-sectional view of a lay-up used in accordance with Example 5 of the present invention.

As shown in FIG. 5, a graphite boat 77 having internal dimensions of about 10 inches (254 mm) square by about 4 inches (102 mm) deep was prepared by lining the bottom of the graphite boat 77 with a sheet of GRAFOIL ® graphite foil 71 (Union Carbide Company, Danbury, Conn.) having dimensions of about 10 inches (254 mm) square by about 0.015 inch (0.38 mm) thick. An about 1 inch (25 mm) thick layer of a bedding material 72 comprising by weight about 97½% 90 grit E1A-LUNDUM ® alumina (Norton Company, Worcester, Mass.) and about 2½% F-69 borosilicate glass frit (Fusion Ceramics, Inc., Carrollton, Ohio) was poured into the graphite boat 77 and onto the GRAFOIL ® sheet 71. A foam brush was used to establish a level layer of bedding material 72. A matrix metal ingot 73 having dimensions of about 7 inches (178 mm) square by about ½ inch (13 mm) high, weighing about 1003 grams and comprising by weight about 15% silicon, 5% magnesium and the balance aluminum, was placed into the graphite boat 77 and onto the bedding material 72. Four equally spaced square holes measuring about 2⅞ inches (73 mm) square were cut in a GRAFOIL ® graphite foil sheet having dimensions of about 7 inches (178 mm) square by about 0.015 inch (0.38 mm) thick. The GRAFOIL ® sheet 74 was placed into the graphite boat 77 and centered over the matrix metal ingot 73. A total of about 1.8 grams of −50 mesh atomizod magnesium 76 (Hart Corporation, Tamaqua, Pa.) was evenly dispersed throughout the four holes in the GRAFOIL ® sheet 74. The four preforms 75 were centered over the four holes in the GRAFOIL ® sheet 74 such that the final side (as identified above) of each of the preforms was in contact with the magnesium layer 76.

The graphite boat 77 and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased from about room temperature to about 200° C. at a rate of about 200° C. per hour. After maintaining a temperature of about 200° C. for about six hours, the temperature in the furnace was increased to about 550° C. at a rate of about 200° C. per hour. After maintaining a temperature of about 550° C. for about two hours, the temperature in the furnace was increased to about 875° C. at a rate of about 200° C. per hour. After maintaining a temperature of about 875° C. for about 30 hours, the temperature in the furnace was decreased to about 700° C. at a rate of about 200° C. per hour. The graphite boat 77 and its contents were then removed from the furnace. An approximately 10 inch (254 mm) square sheet of FIBERFRAX ® 907-J fiber insulation paper (The Carborundum Company, Niagara Falls, N.Y.) was placed onto a graphite table. The graphite boat 70 and its contents were placed on top of the FIBERFRAX ® insulation material and allowed to cool to room temperature. Upon reaching room temperature, the formed metal matrix composite bodies were easily removed from the solidified carcass of matrix metal by inverting the solidified carcass of matrix metal and applying light hammer blows to the bottom of the carcass of matrix metal.

EXAMPLE 6

This Example further demonstrates that a rigidized filler material may be spontaneously infiltrated to yield a metal matrix composite body.

A metal matrix composite body was fabricated in substantially the same manner as described in Example 5 except that the filler material mixture comprised about 1750, grams of 220 grit 39 CRYSTOLON ® green silicon carbide particulate (Norton Company, Worcester, Mass.); about 250 grams of 500 grit 39 CRYSTOLON ® green silicon carbide particulate; about 250 grams of 800 grit 39 CRYSTOLON ® green silicon carbide particulate; and about 250 grams of 1000 grit 39 CRYSTOLON ® green silicon carbide particulate.

All other procedures for fabricating the metal matrix composite bodies in this Example were substantially the same as described in Example 5. The formed metal matrix composite bodies were easily removed from the solidified matrix metal in a manner substantially identical to the manner described in Example 5.

EXAMPLE 7

This Example further demonstrates that a rigidized preform may be spontaneously infiltrated to yield a highly loaded metal matrix composite body. Specifically, an aqueous solution of BLUONIC ® A colloidal alumina (Wesbond Corp., Wilmington, Del.) weighing about 201 grams was diluted with about 399 grams of deionized water and placed into a one (1) gallon plastic jar (VWR Scientific, Bridgeport, N.J.). About 1400 grams of 500 grit 39 CRYSTOLON ® green silicon carbide particulate (Norton Company, Worcester, Mass.) and about 600 grams of 1000 grit 39 CRYSTOLON ® green silicon carbide particulate were added to the jar. About 2 ml of Colloids 581B defoamer (Colloids, Inc., Newark, N.J.) were then added to the jar to prepare a slurry for sediment casting. A total of four (4) jars were prepared in this manner. The slurries were roll mixed for at least about 5 hours on a jar mill. A Grade GI-1000 silicone rubber mold (Plastic Tooling Supply Co., Exton, Pa.) having an internal cavity measuring about 7 inches (178 mm) square and about 5¼ inches (133 mm) deep was cleaned with tap water and bar soap to remove any dirt or other debris from the mold, and the mold was placed onto a flat rigid aluminum plate. The mold/plate assembly was then placed onto a level vibrating table. The vibrating table was turned on and approximately 3½ jars of the slurry were poured into the mold in a smooth and continuous manner. The mold and its contents were subjected to vibration for at least about 1 hour to condense the slurry into a preform, with excess surface liquid being removed with a sponge. The vibrating table was turned off and the mold/plate/preform assembly was placed into a freezer. Residual water in the preform was permitted to freeze thoroughly, then the mold/plate/preform assembly was removed from the freezer and the frozen sediment cast preform, having dimensions of about 7 inches (178 mm) square by about 3½ inches (89 mm) thick, was removed from the mold. The preform was then placed onto a refractory support plate, which had been covered with a sheet of FIBERFRAX ® 970-J fiber insulation paper (McNeil Refractories, Easton, Pa.). The supported preform was placed into a resistance heated air atmosphere furnace. The furnace temperature was raised from substantially room temperature to about 85° C. in about ½ hour. After maintaining a temperature of about 85° C. for about 24 hours, the temperature was then increased from about 85° C. to about 1050° C. in a period of about 10 hours. After maintaining a temperature of about 1050° C. for about 2 hours, the temperature was decreased to about room temperature in a period of about 10 hours. The preform was removed from the furnace, and it was observed that the preform had sintered and formed a three-dimensional rigidized structure.

Figure 6:
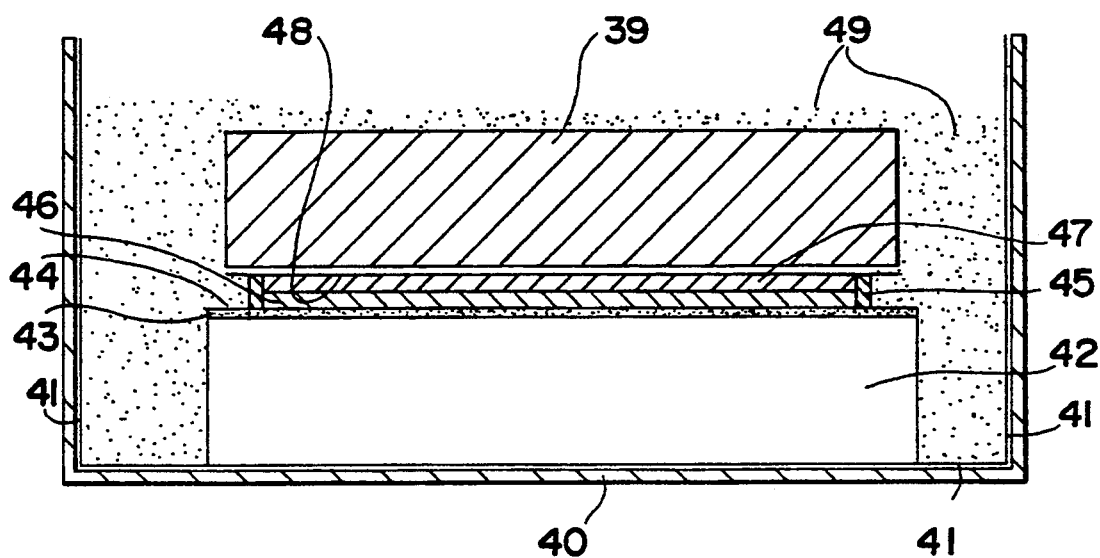
FIG. 6 is a schematic cross-sectional view of a lay-up used in accordance with Example 7 of the present invention.

As shown in cross-section in FIG. 6, a graphite foil box 41 measuring about 11½ inches (292 mm) by about 8½ inches (216 mm), and about 7½ inches (191 mm) high, was fabricated from a single sheet of GRAFOIL ® graphite foil (Union Carbide Company, Danbury, Conn.) measuring about 0.015 inch (0.38 mm) thick by making strategically located cuts and folds in the sheet. The folds in the GRAFOIL ® sheet were cemented together with RIGIDLOCK ® graphite cement (Polycarbon Corporation, Valencia, Calif.). Strategically placed staples helped to reinforce the graphite cement. The GRAFOIL ® box 41 was then placed within a graphite boat 40 having inner dimension which were substantially the same as the dimensions of the GRAFOIL ® box 41. The fired preform 42 was then placed into the bottom of the GRAFOIL ® box 41. An approximately 1 to 2 particle thick layer of −100 mesh magnesium powder 43 (high purity grade, 99.98, Hart Corporation, Tamaqua, Pa.) was sprinkled evenly over the top surface of the fired preform 42.

A gating means for controlling the supply of matrix metal which contacted the preform was constructed in the following manner. A sheet of GRAFOIL ® 44 measuring about 7 inches (178 mm) square was prepared by cutting an approximately 6 inch (152 mm) diameter hole in the center of the sheet. A graphite riser ring 45 measuring about ⅜ inch (10 mm) high and about 6 inches (152 mm) in inside diameter was cemented to the GRAFOIL ® sheet 44 using RIGIDLOCK ® graphite cement (Polycarbon Corporation, Valencia, Calif.) such that the inside diameter of the ring 45 substantially coincided with the hole in the GRAFOIL ® sheet 44. The gating means, comprising the GRAFOIL ® sheet 44 and the graphite riser ring 45, was then placed into the graphite boat 40 on top of the layer of magnesium powder 43 and oriented such that the GRAFOIL ® sheet 44 contacted the magnesium powder layer 43 and the graphite riser ring 45 was on a top surface of the GRAFOIL ® sheet 44. The graphite riser ring 45 was then filled to about half of its height with an admixture 46 comprising by weight about 98 percent (comprising about 70 percent 54 grit and about 30 percent 90 grit) 39 CRYSTOLON ® green silicon carbide particulate (Norton Company, Worcester, Mass.) and about 2 percent −325 mesh magnesium powder (Hart Corporation). The remaining portion of the graphite riser ring 45 was filled with −100 mesh magnesium powder 47. The riser ring 45 was then covered with a circular sheet of aluminum foil 48 having a diameter measuring about ¼ inch (6 mm) larger than the outside diameter of the graphite riser ring 45. A bedding material admixture 49 comprising by weight about 1500 grams of equal parts 90 grit, 220 grit, and 500 grit E1ALUNDUM ® alumina (Norton Company) and about 225 grams of F69 glass frit (Fusion Ceramics, Inc., Carrollton, Ohio) was poured into the graphite boat 40 to a level substantially flush with the top of the graphite riser ring 45. Excess loose bedding material 49 was then carefully removed from the aluminum foil cover 48. A matrix metal ingot 39 weighing about 5286 grams and comprising by weight about 15 percent silicon, about 5 percent magnesium and the balance aluminum, was placed into the graphite boat 40 and centered over the graphite riser ring 45 to form a lay-up. Additional bedding material 49 was added around the matrix metal until the ingot 39 was covered with an about ½ inch (13 mm) layer of bedding material 49.

The graphite boat 40 and its contents were then placed into a resistance heated controlled atmosphere furnace at substantially room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was then increased to about 200° C. in about 1 hour. After maintaining a temperature of about 200° C. for about 24 hours, the furnace temperature was then increased to about 800° C. at a rate of about 200° C. per hour. After maintaining a temperature of about 800° C. for about 60 hours, the temperature was then decreased to about 700° C. at a rate of about 200° C. per hour. At a temperature of about 700° C., the furnace was opened and the graphite boat 40 and its contents were removed and placed onto a water cooled aluminum quench plate. The top and sides of the graphite boat 40 were covered with an approximately 2 inch (51 mm) thick layer of CERABLANKET ® ceramic fiber insulation material (Manville Refractory Products, Denver, Colo.) to assist in the directional solidification of the matrix metal. At room temperature, the assembly was disassembled to reveal that the matrix metal had spontaneously infiltrated the rigidized preform.

EXAMPLE 8

This Example further demonstrates that a rigidized preform may be spontaneously infiltrated to yield a highly loaded metal matrix composite body.

Sample A

An aqueous solution of BLUONIC ® A colloidal alumina (Wesbond Corporation, Wilmington, Del.) weighing about 201 grams was diluted with about 399 grams of deionized water and placed into a one gallon plastic jar (VWR Scientific, Bridgeport, N.J.). About 1400 grams of 220 grit 39 CRYSTOLON ® green silicon carbide particulate (Norton Company, Worcester, Mass.) and about 600 grams of 500 grit 39 CRYSTOLON ® green silicon carbide particulate were added to the jar. About 2 ml of Colloids 581B defoamer (Colloids, Inc., Newark, N.J.) were then added to the jar to prepare a slurry for sediment casting. A total of two (2) jars were prepared in this manner. The slurries were roll mixed for at least about 5 hours on a jar mill. A Grade GI-1000 silicone rubber mold (Plastic Tooling Supply Company, Exton, Pa.) having an internal cavity measuring about 7 inches (178 mm) square and about 2¼ inches (57 mm) deep was cleaned with tap water and bar soap to remove any dirt or other debris from the mold, and the mold was placed onto a flat rigid aluminum plate. The mold/plate assembly was then placed onto a level vibrating table. The vibrating table was turned on and approximately 1½ jars of the slurry were poured into the mold in a smooth and continuous manner. The mold and its contents were subjected to vibration for at least about 1 hour to condense the slurry into a preform, with excess surface liquid being removed with a sponge. The vibrating table was turned off and the mold/plate/preform assembly was placed into a freezer. Residual water in the preform was permitted to freeze thoroughly, then the mold/plate/preform assembly was removed from the freezer and the frozen sediment cast preform, having dimensions of about 7 inches (178 mm) square by about 1½ inch (38 mm) thick, was removed from the mold. The preform was then placed onto a refractory support plate, which had been covered with a sheet of FIBERFRAX ® 970-J fiber insulation paper (McNeil Refractories, Easton, Pa.). The supported preform was placed into a resistance heated air atmosphere furnace. The furnace temperature was raised from substantially room temperature to about 85° C. in about ½ hour. After maintaining a temperature of about 85° C. for about 24 hours, the temperature was then increased from about 85° C. to about 1050° C. in a period of about 10 hours. After maintaining a temperature of about 1050° C. for about 2 hours, the temperature was decreased to about room temperature in a period of about 10 hours. The preform was removed from the furnace, and it was observed that the preform had sintered and formed a three-dimensional rigidized structure.

Figure 7:
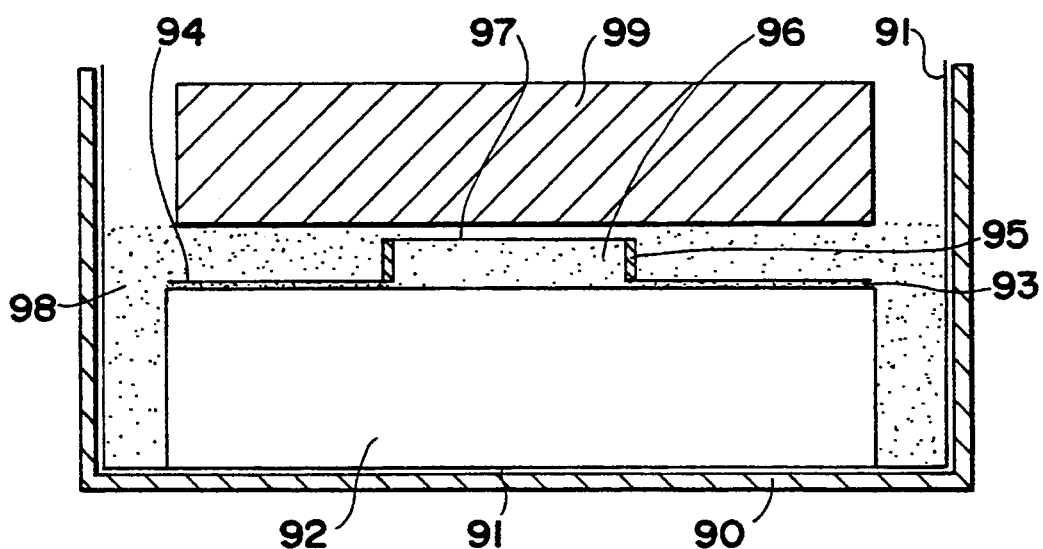
FIG. 7 is a schematic cross-sectional view of a lay-up used in accordance with Example 8, Sample A, of the present invention.

As shown in cross-section in FIG. 7, a graphite foil box 91 measuring about 8½ inches (216 mm) square and about 4 inches (102 mm) high was fabricated from a single sheet of GRAFOIL ® graphite foil (Union Carbide Company,. Danbury, Conn.) measuring about 0.015 inch (0.38 mm) thick by making strategically located cuts and folds in the sheet. The folds in the GRAFOIL ® sheet were cemented together with RIGIDLOCK ® graphite cement (Polycarbon Corporation, Valencia, Calif.). Strategically placed staples helped to reinforce the graphite cement. The GRAFOIL ® box 91 was then placed within a graphite boat 90, having inner dimensions which were substantially the same as the dimensions of the box 91. The fired preform 92 was then placed into the bottom of the GRAFOIL ® box 91. An approximately 1 to 2 particle thick layer of −100 mesh magnesium powder 93 (high purity grade, 99.98, Hart Corporation, Tamaqua, Pa.) was sprinkled evenly over the top surface of the fired preform 92.

A gating means for controlling the supply of matrix metal which contacts the preform 92 was constructed in the following manner. A sheet of GRAFOIL ® 94 measuring about 7 inches (178 mm) square was prepared by cutting an approximately 2½ inch diameter hole in the center of the sheet. Over the hole, a graphite riser ring 95 measuring about ⅜ inch (10 mm) high and about 2½ inches (64 mm) in inside diameter was cemented to the GRAFOIL ® sheet 94 using RIGIDLOCK ® graphite cement (Polycarbon Corporation) such that the inside diameter of the ring 95 substantially coincided with the hole in the GRAFOIL ® sheet 94. The gating means, comprising the GRAFOIL ® sheet 94 and the graphite riser ring 95, was then placed into the graphite boat 90 on top of the layer of magnesium powder 93 and oriented such that the GRAFOIL ® sheet 94 contacted the magnesium powder layer 93 and the graphite riser ring 95 was on a top surface of the GRAFOIL ® sheet 94. The graphite riser ring 95 was then filled with −100 mesh magnesium powder 96. The riser ring 95 was then covered with a circular sheet of aluminum foil 97 having a diameter of about ¼ inch (6 mm) larger than the outside diameter of the graphite riser ring 95. A bedding material admixture 98 comprising by weight about 1500 grams of equal parts 90 grit, 220 grit, and 500 grit E1ALUNSUM ® alumina (Norton Company, Worcester, Mass.) and about 225 grams of F69 glass frit (Fusion Ceramics, Inc., Cleveland, Ohio) was poured into the graphite boat 90 to a level substantially flush the top of the graphite riser ring 95. Loose bedding material 98 was then carefully removed from the aluminum foil cover 97. A matrix metal ingot 99 weighing about 2341 grams and comprising by weight about 15% silicon, about 5% magnesium, and the balance aluminum, was placed the graphite boat 90 and centered over the graphite riser ring 95 to form a lay-up.

The graphite boat 90 and its Contents were then placed into a resistance heated controlled atmosphere furnace at substantially room temperature. The furnace was sealed, evacuated to about 30 inches (762 mm) of mercury vacuum, and backfilled with nitrogen gas to about atmospheric pressure. A nitrogen gas flow rate of about 4 liters per minute was established in the furnace. The temperature in the furnace was then increased to about 250° C. at a rate of about 200° C. per hour. After maintaining a temperature of about 250° C. for about 39½ hours, the furnace temperature was then increased to about 825° C. at a rate of about 150° C. per hour. After maintaining a temperature of about 825° C. for about 20 hours, the temperature was then decreased to about 675° C. at a rate of about 200° C. per hour. At a temperature of about 675° C., the furnace was opened and the graphite boat 90 and its contents were removed and placed onto a water cooled aluminum quench plate. FEEDOL ® No. 9 hot topping particulate mixture (Foseco, Inc., Cleveland, Ohio) was poured onto the residual molten matrix metal reservoir to directionally solidify the matrix metal in the metal matrix composite body. After the bulk of the exothermic hot topping reaction had subsided, the top and sides of the graphite boat 90 were covered with an approximately 2 inch (51 mm) thick layer of CERABLANKET ® ceramic fiber insulation material (Manville Refractory Products, Denver, Colo.) to assist in the directional solidification of the matrix metal. At room temperature, the assembly was disassembled to reveal that the matrix metal had spontaneously infiltrated the rigidized preform.

Sample B

A metal matrix composite body was fabricated in essentially the same manner as described in Sample A. The formed metal matrix composite body was sectioned into test coupons and mechanical property data was obtained by the following procedures.

Measurement of Four Point Flexural Strength

The four point flexural strength of the metal matrix composite material was determined using MIL-STD-1942A, Flexural Strength of High Performance Ceramics at Ambient Temperature. Rectangular flexural strength test specimens having dimensions of about 2 inches (51 mm) long by about 0.24 inch (6 mm) wide by about 0.12 inch (3 mm) thick were used. Test Figure configuration B as outlined in Section 5.2 of MIL-STD-1942A was employed. The four point test fixture was then placed onto the base of Model No. CITS 2000/6 universal testing machine (System Integration Technology, Inc., Stoughton, Mass.) having a 500 lb (2225 N) full scale deflection load cell. A computer data acquisition system was connected to the measuring unit and strain gauges in the load cell recorded the test responses. The flexural strength test specimens were deformed at a constant cross-head travel rate of about 0.51 millimeters per minute. The flexural strength and the maximum strain to failure were calculated from the sample geometry and recorded responses with programs from within the computer.

Measurement Of Ultimate Tensile Strength (U.T.S.)

The tensile strength was determined using ASTM #B557-84 "Standard Methods of Tension Testing Wrought and Cast Aluminum and Magnesium Products". The geometry of the pin-loaded tensile bar is shown in FIG. 6. The strain of the pin-loaded tension test specimen was measured with strain gauges (350 ohm bridges) designated CEA-06-375UW-350 from Micromeasurements of Raleigh, N.C. The tensile test bar was placed into the gripping fixture on a Syntec 5000 pound (2269 kg) load cell (Universal Testing Machine, Model No. CITS 2000/6 manufactured by System Integration Technology Inc., of Straton, Mass.). A computer data acquisition system was connected to the measuring unit, and the strain gauges recorded the test responses. The test specimen was deformed at a constant rate of 0.020 inches/minute (0.508 mm/minute) to failure. The maximum stress, maximum strain and strain to failure were calculated from the sample geometry and recorded responses with programs within the computer.

Measurement of Elastic Modulus by the Resonance Method

The elastic modulus of the metal matrix composite was determined by a sonic resonance technique which is substantially the same as ASTM method C848-88. Specifically, a composite sample measuring from about 1.8 to 2.2 inches long, about 0.24 inches wide and about 1.9 inches thick (about 45 mm to about 55 mm long, about 6 mm wide and about 4.8 mm thick) was placed between two transducers isolated from room vibrations by an air table supporting a granite stone. One of the transducers was used to excite frequencies within the composite sample while the other was used to monitor the frequency response of the metal matrix composite. By scanning through frequencies, monitoring and recording the response levels for each frequency and noting the resonant frequency, the elastic modulus was determined.

Measurement of the Fracture Touqhness for Metal Matrix Composite Using a Chevron Notch Specimen The method of Munz, Shannon and Bubsey, was used to determine the fracture toughness of metal matrix composite. The fracture toughness was calculated from the maximum load of Chevron notch specimen in four point loading. Specifically, the geometry of the Chevron notch specimen was about 1.8 to 2.2 inches (45 to 55 mm) long, about 0.19 inches (4.8 mm) wide and about 0.24 inches (6 mm) high. A Chevron notch was cut with a diamond saw to propagate a crack through the sample. The Chevron notched samples, the apex of the Chevron pointing down, were placed into a fixture within a Universal test machine. The notch of the Chevron notch sample, was placed between two pins 1.6 inches (40 mm) apart and approximately 0.79 inch (20 mm) from each pin. The top side of the Chevron notch sample was contacted by two pins 0.79 inch (20 mm) apart and approximately 0.39 inch (10 mm) from the notch. The maximum load measurements were made with a Sintec Model CITS-2000/6 Universal Testing Machine manufactured by System Integration Technology Incorporated of Straton, Mass. A cross-head speed of 0.02 inches/minute (0.58 millimeters/minute) was used. The load cell of the Universal testing machine was interfaced to a computer data acquisition system. Chevron notch sample geometry and maximum load were used to calculate the fracture toughness of the material. Several samples were used to determine an average fracture toughness for a given material.

Measurement of Apparent Density

The apparent density of a sample is measured by first insuring that the sample is completely dry. The mass of the sample is determined as accurately as possible. The sample is then placed into the sample chamber of an AccuPyc 1330 Autopycnometer (Micromeritics, Inc., Norcross, Ga.). The autopycnometer automatically calculates the apparent volume of the sample. Apparent density is found by simply dividing the apparent volume into the mass.

The mechanical properties of the formed metal matrix composite body of this Sample B are listed in Table I.

TABLE I

MECHANICAL PROPERTIES FOR METAL MATRIX COMPOSITE BODY OF EXAMPLE 8, SAMPLE B

| | |
|---|---|
| Density (g/cc): | 3.00 |
| Elastic Modulus (GPa): | 270 |
| Four Point Flexural Strength (MPa): | 316 ± 10 |
| Fracture Toughness (MPa-m$^{\frac{1}{2}}$): | 11.0 ± 0.3 |
| Ultimate Tensile Strength (MPa): | 251 ± 11 |

EXAMPLE 9

Figure 8:
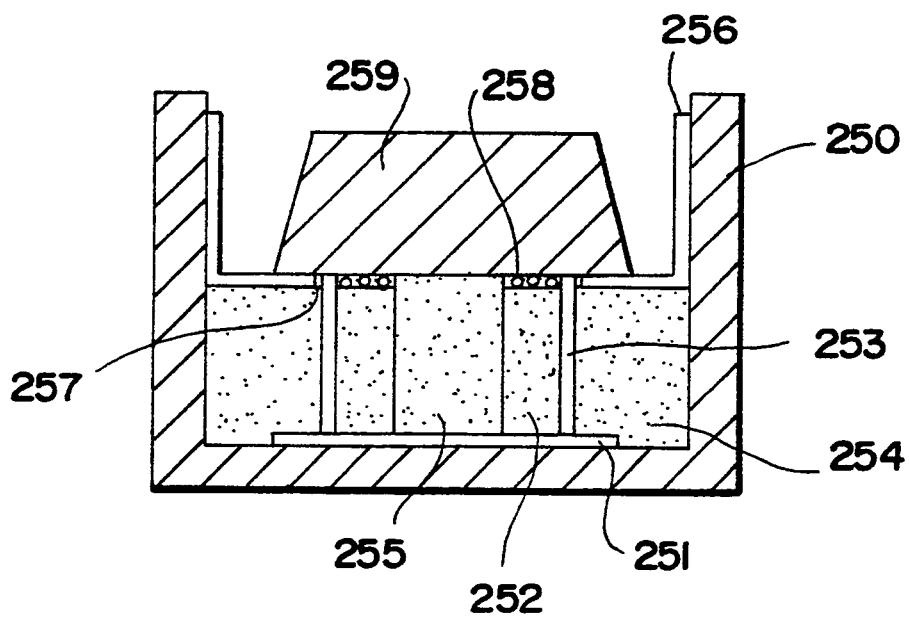
FIG. 8 is a schematic cross-sectional view of a lay-up used in accordance with Example 9 of the present invention.

This Example demonstrates that rigidized preforms having a high volume fraction of filler material may be spontaneously infiltrated to form metal matrix composite bodies. FIG. 8 shows a schematic cross-sectional view of the setup used to produce the metal matrix composite of this Example, as described below. Specifically, a steel mold 250 was prepared, having an inner cavity measuring about 6 inches (152 mm) long by about 6 inches (152 mm) wide by about 6 inches (152 mm) deep. The bottom surface of the steel mold 250 was covered with a piece of graphite foil 251 (Grafoil ® from Union Carbide), having dimensions of about 3 inches (76 mm) long by about 3 inches (76 ram) wide by about 0.015 inches (0.38 mm) thick. A commercially available sintered silicon carbide preform 252 (obtained from I Squared R Element, Inc., Akron, N.Y.), having an outer diameter of about 1.75 inches (45 mm) add an inner diameter of about 0.75 inches (19 mm) and cut to a length of about 3 inches (76 mm), was wrapped in a piece of graphite foil 253 and placed onto the graphite foil 251 in the steel box 250. A 90 grit alumina material 254 (38 Alundum, Norton Company, Worcester, Mass.) was poured into the space between the silicon carbide preform 252 and the steel mold 250. The inner cavity of the silicon carbide preform was substantially filled with graphite powder 255 (KS-44 from Lonza, Inc., Fair Lawn, N.J.). A graphite foil box 256, measuring about 5.75 inches (146 mm) long by about 5.75 inches (146 mm) wide by about 3 inches (76 mm) deep was constructed from a single sheet of GRAFOIL ® graphite foil {Union Carbide Company, Danbury, Conn.) measuring about 0.015 inch (0.38 mm) thick by making strategically located cuts and folds in the sheet. The folds in the GRAFOIL ® sheet were cemented together with RIGIDLOCK ® graphite cement (Polycarbon Corporation, Valencia, Calif.). Strategically placed staples helped to reinforce the graphite cement. A hole 257, measuring about 1.75 inches (43 mm) in diameter and corresponding to the outer diameter of the silicon carbide preform 252, was cut into the bottom of the graphite foil box 256 and the graphite foil box 256 was placed around the top of the silicon carbide preform 252 in the steel mold 250. A -100 mesh magnesium powder material 258 (Hart Corporation, Tamaqua, Pa.) was placed on the top surface of the silicon carbide preform 252 extending into the graphite foil box 256. A matrix metal 259 comprising by weight 12 percent silicon, 6 perce magnesium and the balance aluminum, was placed into the graphite foil box 256 contained within the steel mold 250.

The steel mold 250 and its contents were placed into a room temperature retort lined resistance heated furnace. The retort door was closed, and the retort was evacuated to at least 30 inches (762 mm) Hg. After the vacuum was reached, nitrogen was introduced into the retort chamber at a flow rate of about 3 liters/minute. The retort lined furnace was then heated to about 800° C. at a rate of about 200° C./hour and held for about 10 hours at about 800° C. with a flowing nitrogen atmosphere of about 3 liters/minute. The retort lined furnace was then ramped from about 800° C. to about 675° C. at a rate of about 200° C./hour. At about 675° C., the steel mold 250 and its contents were removed from the retort and placed onto a room temperature graphite plate to directionally solidify the metal matrix composite and the carcass of residual matrix metal. At room temperature, the assembly was disassembled to reveal that the matrix metal had spontaneously infiltrated the rigidized preform.

EXAMPLE 10

Figure 9:
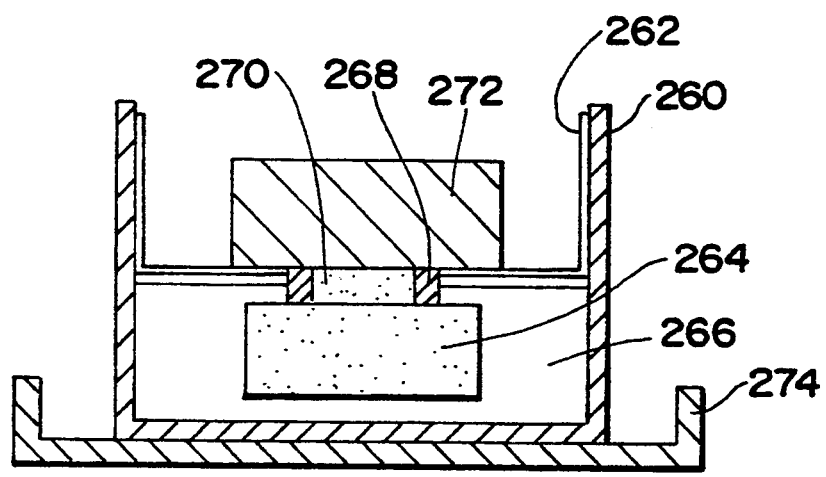
FIG. 9 is a schematic cross-sectional view of a lay-up used in accordance with Example 10 of the present invention.

This Example demonstrates that a rigidized preform can be infiltrated by spontaneous infiltration to produce a metal matrix composite. The setup for the spontaneous infiltration is shown schematically in FIG. 9.

A stainless steel container 260 measuring about 4 inches (102 mm) square by about 3 inches (76 mm) tall was lined with GRAFOIL ® graphite foil (Union Carbide Company, Danbury Conn.). Specifically, a sheet of GRAFOIL ® about 15 mils thick was cut and folded to form a box of substantially the same size and shape as the inner dimensions of the stainless steel container 260. The folds in the GRAFOIL ® sheet were cemented together with RIGIDLOCK ® graphite cement (Polycarbon Corporation, Valencia, Calif.) to help maintain the shape of the GRAFOIL ® box. Furthermore, the box was stapled together at strategic locations to reinforce the graphite cement.

About 153 grams of a blend of green silicon carbide particulates with a maximum particle size of about 70 microns was injection molded, by Technical Ceramic Laboratories, Inc., Alpharetta, Ga., using a suitable binder and other injection molding additives to form a preform 264 measuring about 2¼ inches (57 mm) in diameter and about 1 inch (25 mm) thick. The concentration of silicon carbide in the injection molded preform 264 amounted to about 70 volume percent.

Grade C-75 unground alumina (Alcan Chemicals Division of Aluminum Company of Canada Limited, Montreal, Quebec, Canada) was poured onto a refractory plate measuring about 11 inches (279 mm) long by about 6 inches (152 mm) wide by about 1 inch (25 mm) thick to a depth of about ½ inch (13 mm) and leveled. The injection molded preform was then placed on top of the layer of alumina particulate. The refractory plate and its contents were then placed into a resistance heated air atmosphere furnace at substantially room temperature. The furnace temperature was then increased to about 1050° C. over a period of about 24 hours. After maintaining a temperature of about 1050° C. for about 2 hours, power to the furnace was turned off and the furnace was allowed to cool back to room temperature. When the furnace chamber had reached substantially room temperature, the refractory plate and its contents were removed from the furnace revealing that the organic constituents in the injection molded preform had volatilized or had combusted and that the surfaces of the silicon carbide particles had oxidized to silica ($SiO_2$) which fused the particles to one another at contact points between particles to produce a rigidized preform.

An admixture of bedding material 266 comprising by weight about 15 percent Grade P 54P borosilicate glass frit (Inorganic Chemicals Division, Mobay Chemical Corporation, Baltimore, Ohio) and the balance equal parts by weight of 90 grit, 220, grit and 500 grit E1A-LUNDUM ® fused alumina (Norton Company) was poured into the GRAFOIL ® lined steel container 260 to a depth of about ¼ inch (6 mm) and leveled. The fired preform 264 was placed into the GRAFOIL ® lined steel container 260 and centered in the steel container on top of the bedding material admixture 266. A graphite riser ring gating means 268 having an outer diameter of about 1½ inches (38 mm) and an inner diameter of about 1 inch (25 mm) and measuring about 3/8 inch (10 mm) tall was centered on the top of the preform 264. Additional bedding material admixture 266 was poured into the steel container around the preform and the graphite riser ring 268 to a level of about ⅛ inch (3 mm) from the top of the graphite ring, and was then leveled. A GRAFOIL ® box 262, having substantially the same dimensions as the GRAFOIL ® liner in the stainless steel container 260 was fabricated by strategically cutting and folding a GRAFOIL ® sheet, cementing the folds with RIGIDLOCK ® graphite cement (Polycarbon Corporation, Valencia, Calif.) and stapling the GRAFOIL ® box to reinforce the RIGIDLOCK ® cement. An approximately 1 inch (25 mm) diameter hole was cut into the center of the bottom of the GRAFOIL ® box 262 such that when the GRAFOIL ® box 262 was placed into the steel container 260 the hole substantially lined up with the inner diameter of the graphite riser ring 268. With the GRAFOIL ®box 262 in the steel container 260 and centered over the graphite riser ring 268, the top of the GRAFOIL ® box 262 was trimmed such that the top of the GRAFOIL ® box was of substantially the same height as the steel container. About 3 grams of magnesium particulate 270 (−100 mesh, Hart Corporation, Tamaqua, Pa.) was poured into the space inside the graphite riser ring 268 and leveled. A matrix metal ingot 272 measuring about ¾ inch (19 mm) square by about 1 inch (25 mm) thick weighing about 460 grams and comprising by weight about 12 percent silicon, 6 percent magnesium, and the balance commercially pure aluminum, was placed into the GRAFOIL ® box 262 and centered over the hole in the bottom of the box to form a lay-up.

The steel container 260 and its contents were then placed onto a graphite catcher plate 274 measuring about 14 inches (356 mm) long by about 10¼ inches (260 mm) wide by about 1 inch (25.4 mm) tall and having a wall thickness of about ¼ inch (6 mm). The graphite catcher plate 274 and its contents were then placed into an electric resistance heated controlled atmosphere furnace (retort). The retort was sealed, evacuated to about 30 inches (762 mm) of mercury vacuum, and then backfilled with nitrogen gas to substantially atmospheric pressure. A nitrogen gas flow rate of about 4 liters per minute was established. The temperature in the retort was then increased from substantially room temperature to a temperature of about 850° C. at a rate of about 200° C. per hour. After maintaining a temperature of about 850° C. for about 15 hours, the temperature was then decreased to about 760° C. at a rate of about 200° C. per hour. At a temperature of about 760° C., the graphite catcher plate 274 and its contents were removed from the retort and placed onto a water cooled aluminum quench plate to directionally solidify the matrix metal. FEEDOL ® No. 9 hot topping particulate mixture was poured on top of the molten matrix metal reservoir 272. After the bulk of the exothermic reaction had subsided, an approximately 2 inch (51 mm) thick layer of CERABLANKET ® ceramic fiber insulation (Manville Refractory Products, Denver, Colo.) was placed over the top and around the sides of the steel container 260. After cooling to substantially room temperature, the lay-up was removed from the steel container 260 and the bedding material admixture 266 was removed with light hammer blows to reveal that the matrix metal 272 had infiltrated of the preform 264 to produce a metal matrix composite. Thus, this Example illustrates that a rigidized preform can be infiltrated using a spontaneous infiltration process to produce a metal matrix composite.

EXAMPLE 11

This example further demonstrates that a rigidized preform can be infiltrated by a molten matrix metal via a spontaneous infiltration technique.

An aqueous solution of BLUONIC ® A colloidal alumina (Wesbond Corp., Wilmington, Del.) weighing about 200 grams was diluted with about 400 grams of deionized water and placed into a one-gallon plastic jar (Fischer Scientific, Pittsburgh, Pa.). About 1400 grams of 220 grit 39 CRYSTOLON ® green silicon carbide particulate (Norton Company, Worcester, Mass.), about 600 grams of 500 grit 39 CRYSTOLON ® green silicon carbide particulate and about 2 ml of COLLOIDS 581-B defoamer (Colloids, Inc., Newark, N.J.) were also added to the jar to prepare a slurry for sediment casting. The plastic jar and its contents were placed onto a roller mill and roll mixed for about 5 hours.

A grade GI-1000 silicone rubber mold (Plastic Tooling Supply Company, Exton, Pa.) having an internal cavity measuring about 3 inches (76 mm) square and about 1 inch (25 mm) deep was placed onto a flat rigid aluminum plate, and the mold and aluminum plate were placed on a vibrating table. The vibrating table was turned on, and about 270 grams of the slurry was poured into the rubber mold. The mold and slurry was vibrated for about 1 hour to sediment cast the slurry into a preform, with excess water on the surface of the sediment cast preform being removed with a sponge. After vibrating the mold for about 1 hour, the vibrating table was turned off and the aluminum plate/mold assembly containing the sediment cast preform was removed from the vibrating table and placed into a freezer. Residual water in the preform was permitted to freeze thoroughly and the aluminum plate/mold assembly was removed from the freezer and the frozen sediment cast preform was removed from the mold.

An about 12 inch (305 mm) long by about 6 inch (152 mm) wide sheet of FIBERFRAX ® 907J fiber insulation paper (The Carborundum Company, Niagara Falls, N.Y.) was placed onto a refractory plate having dimensions of about 12 inches (304 mm) long by about 6 inches (152 mm) wide by about 1 inch (25 mm) thick and the preform was placed onto the fiber insulation paper. The refractory plate/fiber insulation paper/preform assembly was placed within a room temperature air atmosphere furnace. The temperature in the furnace was increased from about room temperature to about 85° C. in about 1 hour. After maintaining a temperature of about 85° C. for about 10 hours, the temperature in the furnace was increased to about 1050°C. in about 10 hours. After maintaining a temperature of about 1050°0 C. for about 2 hours, the temperature in the furnace was decreased to about room temperature in about 5 hours. The refractory plate/fiber insulation paper/preform assembly was removed from the furnace. The preform was inspected, and it was observed that the preform had sintered and formed a three-dimensional rigidized body.

Five sides of the preform were lightly spray coated with KRYLON ® acrylic spray coating (Borden Inc., Columbus, Ohio). A mixture to be used as a barrier coating comprising by volume about 50% DAG ® 154 colloidal graphite (Acheson Colloids, Port Huron, Mich.) and about 50% denatured ethanol was prepared. An air brush was used to apply a thin layer of barrier coating to the five sides of the preform previously coated with the acrylic spray Coating. The barrier coating was allowed to dry. A total of three barrier coatings were applied in this manner.

Figure 10:
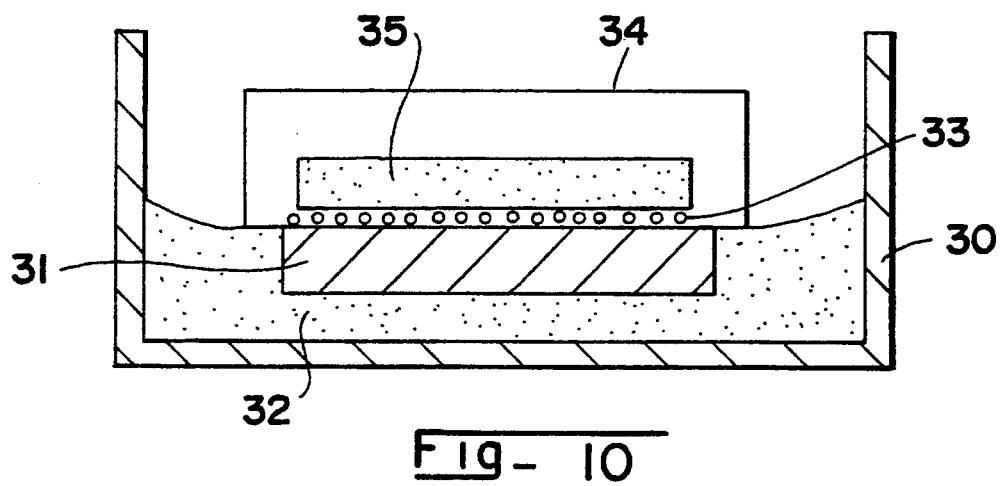
FIG. 10 is a schematic cross-sectional view of a lay-up used in accordance with Example 11 of the present invention.

As shown in FIG. 10, an about 1 inch (25 mm) layer of bedding material 32 comprising by weight about 15% F-69 borosilicate glass frit (Fusion Ceramics, Inc., Carrollton, Ohio) and the balance equal proportions of 90, 220 and 500 grit E1ALUNDUM ® alumina (Norton Company, Worcester, Mass.) was poured into a graphite boat 30 having internal dimensions of about 10 inches (254 mm) square by about 4 inches (102 mm) high. A matrix metal ingot 31 comprising by weight about 15% silicon, 5% magnesium and the balance aluminum, was placed into the graphite boat 30 and onto the bedding material 32. The matrix metal ingot 31 had dimensions of about 3¼ inches (83 mm) by about 4 inches (102 mm) by about ½ inch (13 mm) and weighed about 561 grams. Additional bedding material 32 was poured into the graphite boat 30 to a level substantially the same as that of the top portion of the matrix metal ingot 31. An about 1 particle-thick layer of −50 mesh atomized magnesium 33 (Hart Corporation, Tamaqua, Pa.) was sprinkled onto the top surface of the matrix metal ingot 31. The preform 35 was placed into the graphite boat 30 so that the uncoated surface of the preform was in contact with the layer of −50 mesh atomized magnesium 33.

A graphite foil box 34 measuring about 3½ inches (89 mm) by 7 inches (178 mm) by 2 inches (51 mm) high was fabricated from a single sheet of GRAFOIL ® graphite foil {Union Carbide Company, Danbury, Conn.) measuring about 0.015 inch {0.38 mm) thick by making strategically located cuts and folds in the sheet. The folds in the GRAFOIL ® sheet were cemented together with RIGIDLOCK ® graphite cement (Polycarbon Corporation, Valencia, Calif.). Strategically placed staples helped to reinforce the graphite cement. The GRAFOIL ® box 34 was inverted and placed into the graphite boat 30 over the preform 35. Light hand pressure was applied to the GRAFOIL ® box 34 to embed the walls of the box 34 in the bedding material 32.

The graphite boat 30 and s contents were placed into a resistance heated controlled atmosphere furnace at about room temperature. The furnace was sealed, evacuated to about 30 inches (762 mm) of mercury vacuum, and backfilled with nitrogen gas to about atmospheric pressure. A nitrogen gas flow rate of about 5 liters per minute was established within the furnace. The temperature in the furnace was increased at a rate of about 200° C. per hour to about 300° C. After maintaining a temperature of about 300° C. for about 2 hours, the temperature in the furnace was increased to about 800° C. in about 2½ hours. After maintaining a temperature of about 800° C. for about 10 hours, the temperature in the furnace was decreased to about 700° C. in about ½ hour. The furnace door was opened, the GRAFOIL ® box 34 was removed and the now formed metal matrix composite body was removed from the graphite boat 30. The metal matrix composite body was placed onto a sheet of FIBERFRAX ® 907J fiber insulation paper (The Carborundum Company, Niagara Falls, N.Y.) and allowed to cool to room temperature.

EXAMPLE 12

An aqueous solution of BLUONIC ® A colloidal alumina (Wesbond Corp., Wilmington, Del.) weighing about 61.6 grams was diluted with about 122.6 grams of deionized water and placed into a 16 ounce NALGENE ® plastic jar (Nalge Company, Rochester, N.Y.). About 430.4 grams of 220 grit 39 CRYSTOLON ® green silicon carbide particulate (Norton Company, Worcester, Mass.), about 184.8 grams of 500 grit 39 CRYSTOLON ® green silicon carbide particulate and an amount of Dow experimental ceramic binder XUS40303.00 (Dow Chemical Company, Midland, Mich.), weighing approximately 0.6 grams, were added to the jar to prepare a slurry for casting. The jar and its contents were roller milled for about 2 hours, then the jar and its contents were placed on an orbital mixer and mixed for about 2 hours, then removed.

A Grade GI-1000 silicone rubber mold (Plastic Tooling Supply Company, Exton, Pa.) having a circular internal cavity measuring about 6 inches (152 mm) in diameter by about 0.0635 inch (2 mm) deep was placed onto a flat rigid aluminum plate. The filler material slurry was poured into the mold until the mold was substantially full. The aluminum plate/mold assembly and its contents were then placed within a vacuum chamber, and a vacuum of about 28 inches (711 mm) of mercury was established within the chamber. After about 2 minutes, atmospheric pressure was re-established within the vacuum chamber and the aluminum plate/mold assembly and its contents were removed from the vacuum chamber. The mold and its contents were then placed on a Syntron magnetic vibrator (FHC, West Reading, Pa.) to form the slurry into a sediment cast preform. The vibrating table was turned on and the control knob was set to about 5. After about 1 minute the control knob was turned down to about 3 and the slurry mixture was scraped towards the middle of the mold utilizing a plastic spatula. After about 4 minutes of vibration with the control knob set at 3, residual water was scraped from the top of the slurry mixture, the vibrating table was turned off, and the preform within the mold was allowed to dry at room temperature for about 3 hours.

The preform was removed from the mold and placed onto a zirconia plate having dimensions of about 6½ inches (165 mm) square by about ½ inch (13 mm) thick. The zirconia plate and preform were placed within a room temperature air atmosphere furnace. The temperature in the furnace was increased from about room temperature to about 100° C. in about 1 hour. After maintaining a temperature of about 100° C. for about 1 hour, the temperature in the furnace was increased to about 1100° C. in about 8 hours. After maintaining a temperature of about 1100° C. for about 2 hours, the temperature in the furnace was decreased to about room temperature in about 5 hours. The zirconia plate and preform were removed from the furnace, and it was observed that the preform had sintered and formed a three-dimensional rigidized structure.

A mixture to be used as a barrier coating comprising by volume about 50% DAG®154 colloidal graphite (Acheson Colloids Company, Port Huron, Mich.) and about 50% denatured ethanol was prepared. An air brush was used to apply a thin layer of barrier coating to one side of the preform. The barrier coating was allowed to dry and an additional thin layer of barrier coating was applied in substantially the same manner. This procedure was repeated until about 0.28 grams of the barrier coating was applied.

Figure 11:
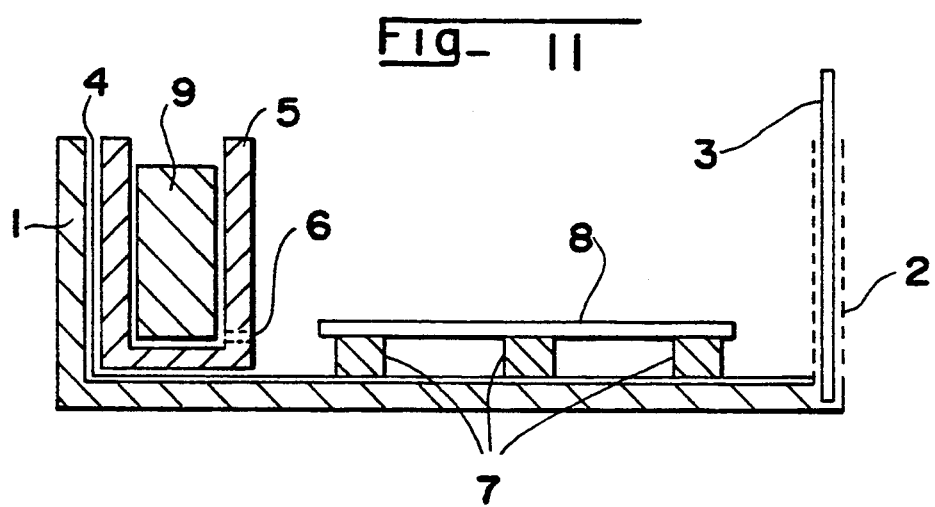
FIG. 11 is a schematic cross-sectional view of a lay-Up used in accordance with Example 12 of the present invention.

As shown in FIG. 11, a graphite boat 1 having internal dimensions of about 9 inches (229 mm) square by about 4 inches (102 mm) high and a wall thickness of about ½ inch (13 mm) was altered in the following manner. An about 8½ inch (216 mm) by about 4 inch (102 mm) section was cut out of one side wall 2 of the graphite boat 1. An about 3/16 (5 mm) inch thick groove was cut into the bottom portion and side portions of the graphite boat 1 to accommodate a sliding door mechanism. A graphite plate 3 measuring about 9 inches (229 mm) wide by about 6 inches (152 mm) high and having a thickness of about 3/16 inch (5 mm) was placed into the grooves to form the sliding door mechanism. The inner surfaces of a portion of the graphite boat 1 were lined with a single sheet of GRAFOIL® graphite foil 4 (Union Carbide Company, Danbury, Conn.) measuring about 0.015 inch (0.4 mm) thick by making strategically located cuts and folds in the sheet. The folds in the GRAFOIL® sheet were cemented together with RIGIDLOCK® graphite cement (Polycarbon Corporation, Valencia, Calif.). The sliding gate mechanism was left unlined. A second graphite boat having internal dimensions of about 1½ inches (38 mm) by about 8 inches (203 mm) and a wall thickness of about ½ inch (13 mm) was placed into the graphite boat 1 next to the wall opposite the sliding door mechanism. Four holes 6 measuring about 5/16 inch (8 mm) in diameter were drilled through the bottom portion of the side wall of the second graphite boat 5 facing the sliding door mechanism. Six graphite riser rings 7 measuring about ¼ inch (6 mm) high and having diameters of about ¾ inch (19 mm) were strategically placed into the first graphite boat 1 to act as a support means for the preform. The graphite riser rings 7 were glued to the GRAFOIL® sheet utilizing GRAPHIBOND™ 551-R graphite cement (Aremco Products, Inc., Ossining, N.Y.).

The preform 8 was placed onto the graphite riser rings 7 within the graphite boat 1 such that the uncoated side of the preform 8 contacted the graphite riser rings 7. A matrix metal ingot 9 comprising by weight about 15% silicon, 5.5% magnesium and the balance aluminum, and having a total weight of about 1496.5 grams, was placed into the second graphite boat 5. The graphite boat 1 and its contents were placed into a resistance heated controlled atmosphere furnace at about room temperature. The furnace was sealed, evacuated to about 30 inches (762 mm) of mercury vacuum, and backfilled with nitrogen gas to about atmospheric pressure. This procedure was repeated a second time. A nitrogen gas flow rate of about 5 liters per minute was established within the furnace. The temperature in the furnace was increased at a rate of about 200° C. per hour to a level of about 800° C. After maintaining a temperature of about 800° C. for about 16 hours, the furnace door was opened and the sliding door mechanism was pulled up utilizing a pair of stainless steel tongs to allow the remaining molten matrix metal drain into a steel boat containing sand. After substantially all of the remaining molten matrix metal had drained into the sand, the sliding gate mechanism was returned to its original position and the furnace door was closed, and the furnace and its contents were allowed to return to room temperature. The door was then opened, the graphite boat 1 and its contents were removed from the furnace and the formed metal matrix composite body was removed from the graphite boat 1. Thus, this Example further demonstrates that a rigidized preform can be infiltrated by a molten matrix metal by a spontaneous infiltration technique.

We claim:

1. A method for making a metal matrix composite comprising:

providing at least one permeable mass of at least one filler;

rigidizing said at least one permeable mass to form at least one rigidized mass by (1) at least one process selected from the group consisting of (a) mixing at least one colloidal oxide having strengthening characteristics with said at least one permeable mass and (b) heating said at least one permeable mass to a sufficient temperature and holding at said temperature for a sufficient amount of time to at least partially sinter at least one of said at least one colloidal oxide having strengthening effects and said at least one filler and (2) at least partially surrounding said at least one permeable mass with at least one precursor to at least one supportive structural refractory material which contacts at least a portion of at least one exterior surface of said at least one permeable mass, causing said at least one precursor to at least one supportive structural refractory material to become at least one supportive structural refractory material; and spontaneously infiltrating at least a portion of said at least one rigidized mass with at least one molten matrix metal.

2. The method of claim 1, wherein said at least one colloidal oxide having strengthening effects and said at least one permeable mass are heated prior to being contacted with at least one molten matrix metal.

3. The method of claim 2, wherein said heating results in an at least partially three-dimensionally interconnected at least one permeable mass.

4. The method of claim 2, wherein said at least one colloidal oxide having strengthening effects comprises at least one of at least one colloidal alumina and at least one colloidal silica.

5. The method of claim 1, wherein said at least one filler comprises at least one silicon carbide and said at least one silicon carbide is at least partially converted to at least one silicon oxide during said at least partially sintering.

6. The method of claim 1, wherein said at least one supportive structural refractory material surrounds a majority of said at least one permeable mass.

7. The method of claim 6, wherein said at least one supportive structural refractory material is formed by providing at least one precursor to said at least one supportive material on at least a portion of at least one exterior surface of sad at least one permeable mass and converting said at least one precursor into said at least one supportive material prior to contacting at least one molten matrix metal with said at least one permeable mass.

8. The method of claim 6, wherein said at least one supportive structural refractory material comprises at least one material selected from the group consisting of steels, graphites, glass frits and colloidal oxides.

9. The method of claim 1, wherein said permeable mass is rigidized by combining at least two of said at least one process and at least partially surrounding said at least one permeable mass with at least one supportive structural refractory material which contacts at least a portion of at least one exterior surface of said at least one permeable mass.

10. The method of claim 1, wherein said infiltrating comprises spontaneous infiltration.

11. The method of claim 10, wherein at least one infiltration enhancer precursor is provided to at least one of said at least one permeable mass, said at least one rigidized mass and said at least one molten matrix metal, and said at least one infiltration enhancer precursor is caused to react to form at least one infiltration enhancer in at least a portion of at least one said at least one permeable mass and said at least one rigidized mass.

12. The method of claim 11, wherein said at least one infiltration enhancer precursor reacts with at least one infiltrating atmosphere.

13. The method of claim 12, wherein said at least one infiltrating atmosphere is present for only a portion of the infiltrating process.

14. The method of claim 1, wherein said at least one colloidal oxide is initially present in said at least one permeable mass in an amount of about 1–15 percent by weight.

15. The method of claim 1, wherein said at least one permeable mass comprises at least one ceramic material.

16. The method of claim 1, wherein said at least one matrix metal comprises aluminum.

17. A method for making a metal matrix composite comprising:
providing at least one permeable mass comprising at least one filler;
at least partially surrounding said at lest one permeable mass with at least one precursor to at least one supportive structural refractory material which contacts at least a portion of at least one exterior surface of said at lest one permeable mass;
providing at least one matrix metal;
providing at least one material comprising at least one of at least one infiltration enhancer precursor and at least one infiltration enhancer to at least one of said at least one permeable mass and said at least one matrix metal;
providing at least one infiltrating atmosphere;
causing said at least one precursor to at least one supportive structural refractory material to become at least one supportive structural refractory material;
causing said at least one matrix metal to become molten; and
spontaneously infiltrating at least a portion of said at least one permeable mass.

18. The method of claim 17, further comprising heating of said at least one permeable mass thereby resulting in an at least partially three-dimensionally interconnected at least one permeable mass.

19. The method of clam 17, further comprising providing at least one colloidal oxide comprising at least one material selected from the group consisting of at least one colloidal alumina and at least one colloidal silica to said at least one permeable mass.

20. A metal matrix composite body made according to claim 17.

* * * * *